United States Patent
Sakakibara et al.

(10) Patent No.: US 8,014,919 B2
(45) Date of Patent: Sep. 6, 2011

(54) VEHICLE CONTROL DEVICE

(75) Inventors: Fumihiko Sakakibara, Tokyo (JP);
Masao Ando, Tokyo (JP); Nobuaki Miki, Tokyo (JP); Hisanori Shirai, Tokyo (JP); Munehisa Horiguchi, Tokyo (JP); Akira Mizuno, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 264 days.

(21) Appl. No.: 12/308,944

(22) PCT Filed: Jun. 29, 2007

(86) PCT No.: PCT/JP2007/063173
§ 371 (c)(1),
(2), (4) Date: Dec. 30, 2008

(87) PCT Pub. No.: WO2008/001913
PCT Pub. Date: Jan. 3, 2008

(65) Prior Publication Data
US 2009/0281691 A1  Nov. 12, 2009

(30) Foreign Application Priority Data

Jun. 30, 2006 (JP) ................. 2006-182533
Nov. 30, 2006 (JP) ................. 2006-325027

(51) Int. Cl.
*G06F 7/00* (2006.01)
(52) U.S. Cl. ..................... 701/36
(58) Field of Classification Search .......... 701/37, 701/70, 36; 280/5.52, 5.521, 5.522, 86.751
See application file for complete search history.

(56) References Cited

U.S. PATENT DOCUMENTS

| 2,787,473 | A | 4/1957 | Chiodo |
| 4,752,079 | A | 6/1988 | Fahrner .................. 280/112 |
| 6,347,802 | B1 * | 2/2002 | Mackle et al. ............. 280/5.521 |
| 2010/0023214 | A1 * | 1/2010 | Horiguchi et al. ............. 701/40 |

FOREIGN PATENT DOCUMENTS

| DE | 199 35 535 | 2/2001 |
| JP | 44-044599 | 12/1972 |
| JP | 47-44599 | 12/1972 |
| JP | 50-118402 | 9/1975 |
| JP | 02-185802 | 7/1990 |
| JP | 05-058320 | 3/1993 |
| JP | 06-001132 | 1/1994 |
| JP | 10-310042 | 11/1998 |
| JP | 2001-063337 | 3/2001 |

OTHER PUBLICATIONS

California State Fuel-Efficient Tire Report: vol. II, California Energy Commission, Jan. 2003, pp. 1-50.

* cited by examiner

*Primary Examiner* — Kim T Nguyen
(74) *Attorney, Agent, or Firm* — Bacon & Thomas, PLLC

(57) ABSTRACT

A vehicle control device and a vehicle are provided with compatibility between high grip performance and fuel efficiency. When a camber angle of a wheel is adjusted as a negative camber, the ground contact pressure on a first tread is increased and the ground contact pressure on a second tread is decreased, thus providing the high grip performance. On the other hand, when the camber angle of the wheel is adjusted as a positive camber, the ground contact pressure on the first tread is decreased and the ground contact pressure on the second tread is increased, thereby reducing rolling resistance and achieving fuel saving. By adjusting the camber angle of the wheel, compatibility can be provided between high grip performance and fuel saving which otherwise conflict with each other.

5 Claims, 15 Drawing Sheets

F I G. 8
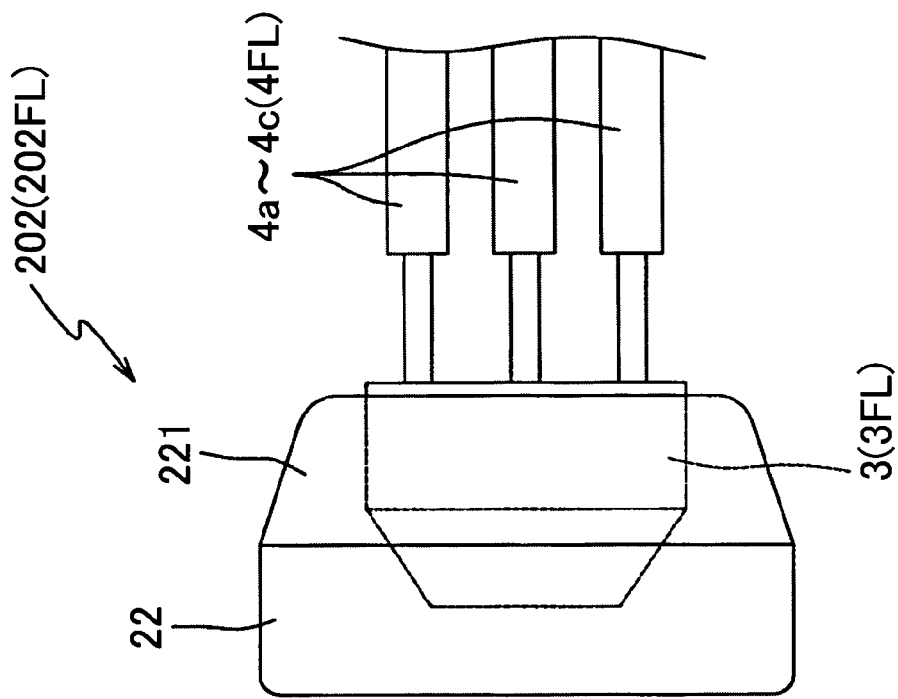

000# VEHICLE CONTROL DEVICE

INCORPORATION BY REFERENCE

The disclosure of Japanese Patent Application No. 2006-182533 filed on Jun. 30, 2006 and Japanese Patent Application No. 2006-325027 filed Nov. 30, 2006, including the specification, drawings and abstract is incorporated herein by reference in its entirety.

BACKGROUND OF THE INVENTION

1. Field of the Invention

The present invention relates to a vehicle control device which activates a camber angle adjustment device to control a camber angle of a wheel for a vehicle including the wheel and the camber angle adjustment device which adjusts the camber angle of the wheel. More particularly, the present invention relates to a vehicle control device which can provide compatibility between high grip performance and fuel efficiency.

2. Description of the Related Art

Attempts have been made to sufficiently bring out the capability of a tire to improve the turning performance by providing a large camber angle (angle formed by the center line of a tire and the ground) of a wheel in a minus direction. This is because, when the camber angle is set to 0° for example, a tread contacts the ground in the entire region in the width direction during straight-ahead driving, while the tread on the inside is caused to float from the ground by the inclination of the vehicle due to the centrifugal force at the time of turning whereby a sufficient turning performance cannot be obtained. Thus, by providing the camber angle in the minus direction in advance, the tread can contact the ground in a large width at the time of turning, whereby the turning performance can be improved.

However, although the turning performance of the tire is improved when the wheel is mounted to the vehicle at a large camber angle in the minus direction, the ground contact pressure on a tread end portion on the inside during the straight-ahead driving is increased whereby there has been a problem that the tire is worn uneconomically and the temperature in the tread end portion increases.

Thus, Japanese Patent Application Publication No. JP-A-2-185802 discloses technology of providing high rigidity by reinforcing a side portion on one side of a tire to be stronger than a side portion on the other side, and ensuring wear resistance, heat resistance, and high grip performance by dividing tread rubber into two such that the hardness is lower on one side than the other side or increasing the tread thickness in a tread end portion, in the case where a wheel is mounted to a vehicle at a large camber angle in a minus direction.

Also, U.S. Pat. No. 6,347,802 B1 discloses a suspension system which performs an active control of a camber angle of a wheel by the driving force of an actuator.

However, in the former technology, there has been a problem that the compatibility between high grip performance and fuel efficiency (low rolling resistance) has been insufficient, although sufficient performance can be obtained in maintaining the high grip performance at the time of turning. In the related-art technology described above, the high grip performance is limited to the time of turning, and there has been a problem that the high grip performance cannot be sufficiently obtained at a sudden acceleration or a sudden brake during the straight-ahead driving, for example. In the same manner, in the latter technology, there has been a problem that the compatibility between the high grip performance and fuel efficiency is insufficient.

SUMMARY OF THE INVENTION

In order to solve the problems described above, it is an object of the present invention to provide a vehicle control device which can provide compatibility between high grip performance and fuel efficiency.

In order to achieve the object, a first aspect of the present invention provides a vehicle control device which activates a camber angle adjustment device which adjusts a camber angle of a wheel to control the camber angle of the wheel for a vehicle including the wheel and the camber angle adjustment device. The vehicle control device includes an activation control unit which controls an activation state of the camber angle adjustment device. The wheel includes at least a first tread and a second tread having a different characteristic from the first tread, the first tread being arranged on an inside or an outside of the vehicle with respect to the second tread in a width direction of the wheel. The first tread is configured to have a characteristic of a higher grip force compared to the second tread and the second tread is configured to have a characteristic of a smaller rolling resistance compared to the first tread. The activation control unit changes a ratio of a ground contact pressure on the first tread and a ground contact pressure on the second tread of the wheel by controlling the activation state of the camber angle adjustment device to adjust the camber angle of the wheel.

A vehicle control device according to a second aspect of the present invention is the vehicle control device according to the first aspect in which the activation control unit includes a ground speed determination unit which determines a ground speed of the vehicle, and a low-speed-time activation control unit which adjusts the camber angle of the wheel by activating the camber angle adjustment device to at least increase the ground contact pressure on the first tread in a case where the ground speed determination unit determines that the ground speed of the vehicle is lower than or equal to a predetermined speed.

A vehicle control device according to a third aspect of the present invention is the vehicle control device according to the first or second aspect in which the activation control unit includes an operation state determination unit which determines an operation state of an operation member operated by a driver, and an operation-time activation control unit which adjusts the camber angle of the wheel by activating the camber angle adjustment device to at least increase the ground contact pressure on the first tread in a case where the operation state determination unit determines that the operation state of the operation member satisfies a predetermined condition.

With the vehicle control device according to the first aspect, when the activation control unit performs the activation control of the camber angle adjustment device and the camber angle of the wheel is adjusted in the minus direction (negative camber direction), the ground contact pressure on the tread arranged on the inside of the vehicle (first tread or second tread) is increased while the ground contact pressure on the tread arranged on the outside of the vehicle (second tread or first tread) is decreased.

On the other hand, when the camber angle of the wheel is adjusted in the plus direction (positive camber direction), the ground contact pressure on the tread arranged on the inside of the vehicle (first tread or second tread) is decreased, while the ground contact pressure on the tread arranged on the outside of the vehicle (second tread or first tread) is increased.

In this manner, with the vehicle control device according to this aspect of the present invention, the ratio of the ground contact pressure on the first tread and the ground contact pressure on the second tread of the wheel (including a state where only one tread contacts the ground and the other tread does not contact the road surface) can be changed in an arbitrary timing by controlling the activation state of the camber angle adjustment device by the activation control unit to adjust the camber angle of the wheel, whereby there is an effect that the compatibility can be provided between two performances one of which is obtained by the characteristic of the first tread and the other of which is obtained by the characteristic of the second tread.

Example combinations of the two performances obtained by the characteristics of the first and second treads include: driving performance (acceleration force and brake force) obtained by high grip performance and fuel saving performance obtained by low rolling resistance; drainage performance obtained by a groove pattern suitable for removal of a water film formed on the road surface and low-noise performance obtained by a groove pattern suitable for reducing a pattern noise; grip performance on an unpaved road obtained by a block pattern which bites into the road surface of the unpaved road and grip performance on a dry paved road obtained by a tread not having a groove to ensure a ground contact area; and performance of exhibiting driving force or brake force on a snow road or icy road and performance of exhibiting driving force or brake force on a paved road surface at normal temperature.

Note that it has been impossible to achieve the compatibility between the two performances which conflict with each other in this manner in a vehicle of the related art, and changing between two types of tires corresponding to the respective performances has been necessary. In the present invention, it has become achievable for the first time by a configuration in which the camber angle of the wheel having the first and second treads is adjusted by the control of the activation state of the camber angle adjustment device by the activation control unit. Accordingly, the compatibility between the two performances which conflict with each other can be achieved.

With the vehicle control device of this aspect of the present invention, since a plurality of types of treads are aligned in the width direction of the wheel, there is an effect that a plurality of performances obtained by the characteristics of the respective treads can be provided by controlling the activation state of the camber angle adjustment device to adjust the camber angle of the wheel.

Specifically, with the this aspect, there is an effect that the compatibility can be provided between the two performances of driving performance (for example, turning performance, acceleration performance, brake performance, or driving stability in the rain or on a snow road) and fuel saving performance, by adjusting the camber angle of the wheel to change the ratio of the ground contact pressure on the first tread and the ground contact pressure on the second tread (including the state where only one tread contacts the ground and the other tread does not contact the road surface), because the first tread is configured to have the characteristic of a higher grip force compared to the second tread and the second tread is configured to have the characteristic of a smaller rolling resistance compared to the first tread.

In the case where the first tread is used, because the tread configured to have the characteristic of the high grip force is arranged on the inside of the vehicle as the first tread, the wheel can be brought to a state where the negative camber is provided. As a result, there is an effect that the turning performance can further be improved.

With the vehicle control device according to the second aspect, in addition to the advantageous effects of the vehicle control device according to the first aspect, there is an effect that the acceleration performance and the brake performance can be improved by using the first tread having the high grip performance, because the ground contact pressure on the first tread can at least be increased by the low-speed-time activation control unit activating the camber angle adjustment device to adjust the camber angle of the wheel in the case where the ground speed determination unit determines that the ground speed of the vehicle is lower than or equal to the predetermined speed.

Specifically, the ground speed being less than or equal to a predetermined value shows that there is a high possibility of the vehicle then decelerating to stop or accelerating. Thus, in such cases, it is necessary to ensure the grip force or the stopping force of the vehicle (wheel) in advance.

With this aspect of the present invention, in the case where the ground speed of the vehicle has become less than or equal to the predetermined value in such situations, the grip force of the wheel can be ensured to improve the acceleration performance and the brake performance by at least increasing the ground contact pressure on the first tread to leverage the high grip performance of the first tread. Note that the adjustment of the camber angle by the low-speed-time activation control unit in this case may be performed such that the ground contact pressure on the first tread becomes larger than the ground contact pressure on the second tread.

After the vehicle is stopped, the stopping force of the vehicle (wheel) can be ensured by leveraging the high grip performance of the first tread. Accordingly, the vehicle can be stopped in a stable state. Further, in the case of restarting after the stop, the ground contact pressure on the first tread being increased in advance prevents the wheel from slipping, whereby the vehicle can be restarted smoothly and promptly.

On the other hand, in the case where the ground speed determination unit does not determine that the ground speed of the vehicle is less than or equal to the predetermined value, the driving force or the brake force applied to the vehicle (wheel) is relatively smaller compared to the case described above. In such a case, with this aspect of the present invention, the ground contact pressure on the second tread can be increased (that is, the ground contact pressure on the first tread can be decreased) by activating the camber angle adjustment device to adjust the camber angle of the wheel. Accordingly, fuel saving driving can be realized by using the second tread having the low rolling resistance. Note that the adjustment of the camber angle by the low-speed-time activation control unit in this case may be performed such that the ground contact pressure on the second tread becomes larger than the ground contact pressure on the first tread.

In this manner, with this aspect, there is an effect that the compatibility can be provided between the two performances of acceleration/deceleration and fuel saving which conflict with each other by the activation control unit (low-speed-time activation control unit) adjusting the camber angle of the wheel to change the ratio of the ground contact pressure on the first tread and the ground contact pressure on the second tread (including the state where only one tread contacts the ground and the other tread does not contact the road surface).

Note that, in the second aspect of the present invention, the case where the ground speed determination unit determines (does not determine) that the ground speed of the vehicle is lower than or equal to the predetermined speed includes not only a case where the actual ground speed of the vehicle measured by a vehicle speed sensor device has already become (has not become) lower than or equal to the predetermined speed, but also a case where the ground speed of the vehicle is expected to be lower than or equal to the predetermined speed (not lower than or equal to the predetermined speed) based on the operation member (for example, the operation state of the accelerator pedal, the brake pedal, or a gear shift) operated by the driver.

With the vehicle control device according to the third aspect of the present invention, in addition to the advantageous effects of the vehicle control device according to the first or second aspect, there is an effect that the acceleration performance, the brake performance, and the turning performance can be improved by using the first tread having the high grip performance, because the ground contact pressure on the first tread can at least be increased by the operation-time activation control unit activating the camber angle adjustment device to adjust the camber angle of the wheel in the case where the operation state determination unit determines that the operation state of the operation member satisfies the predetermined condition.

For example, with a configuration in which the operation-time activation control unit at least increases the ground contact pressure on the first tread by a turn signal switch (operation member) being turned on (as the predetermined condition), the grip force of the wheel can be ensured by leveraging the high grip performance of the first tread when making a right or left turn or a lane change. Accordingly, the turning performance of the vehicle can be improved.

For example, with a configuration in which the operation-time activation control unit at least increases the ground contact pressure on the first tread by a high grip switch (operation member) being turned on (as the predetermined condition), the grip force of the wheel can be ensured based on a command by the driver even in the case where the road surface state (such as snow or ice) cannot be appropriately recognized due to the detection accuracy or the like of a sensor device. Accordingly, a slip or a lock of the wheel can be prevented to improve the brake performance, the acceleration performance, or the turning performance of the vehicle.

For example, with a configuration in which the operation-time activation control unit at least increases the ground contact pressure on the first tread by the depression amount of an accelerator pedal or a brake pedal (operation member) becoming greater than or equal to a predetermined value (as the predetermined condition), the grip force of the wheel can be ensured by leveraging the high grip performance of the first tread when accelerating or braking the vehicle. Accordingly, a slip or a lock of the wheel can be prevented to improve the acceleration performance and the brake performance of the vehicle.

Note that the predetermined condition may be of other state quantities, besides the depression amount of the accelerator pedal or the brake pedal of the predetermined value or greater. Examples include the operation speed of the accelerator pedal or the brake pedal. For example, even if the depression amount of the accelerator pedal or the brake pedal remains the same, the predetermined condition may be satisfied if the operation speed is faster than a reference value.

For example, with a configuration in which the operation-time activation control unit at least increases the ground contact pressure on the first tread by a gear shift (operation member) operation of increasing the deceleration of the transmission being performed (as the predetermined condition), the grip force of the wheel can be ensured by leveraging the high grip performance of the first tread when accelerating/decelerating the vehicle along with the gear shift operation. Accordingly, a slip or a lock of the wheel can be prevented to improve the acceleration performance and the brake performance of the vehicle.

BRIEF DESCRIPTION OF THE DRAWINGS

FIG. 8 is a top view of a wheel according to a second embodiment of the present invention;

DETAILED DESCRIPTION OF THE PREFERRED EMBODIMENTS

Figure 1:
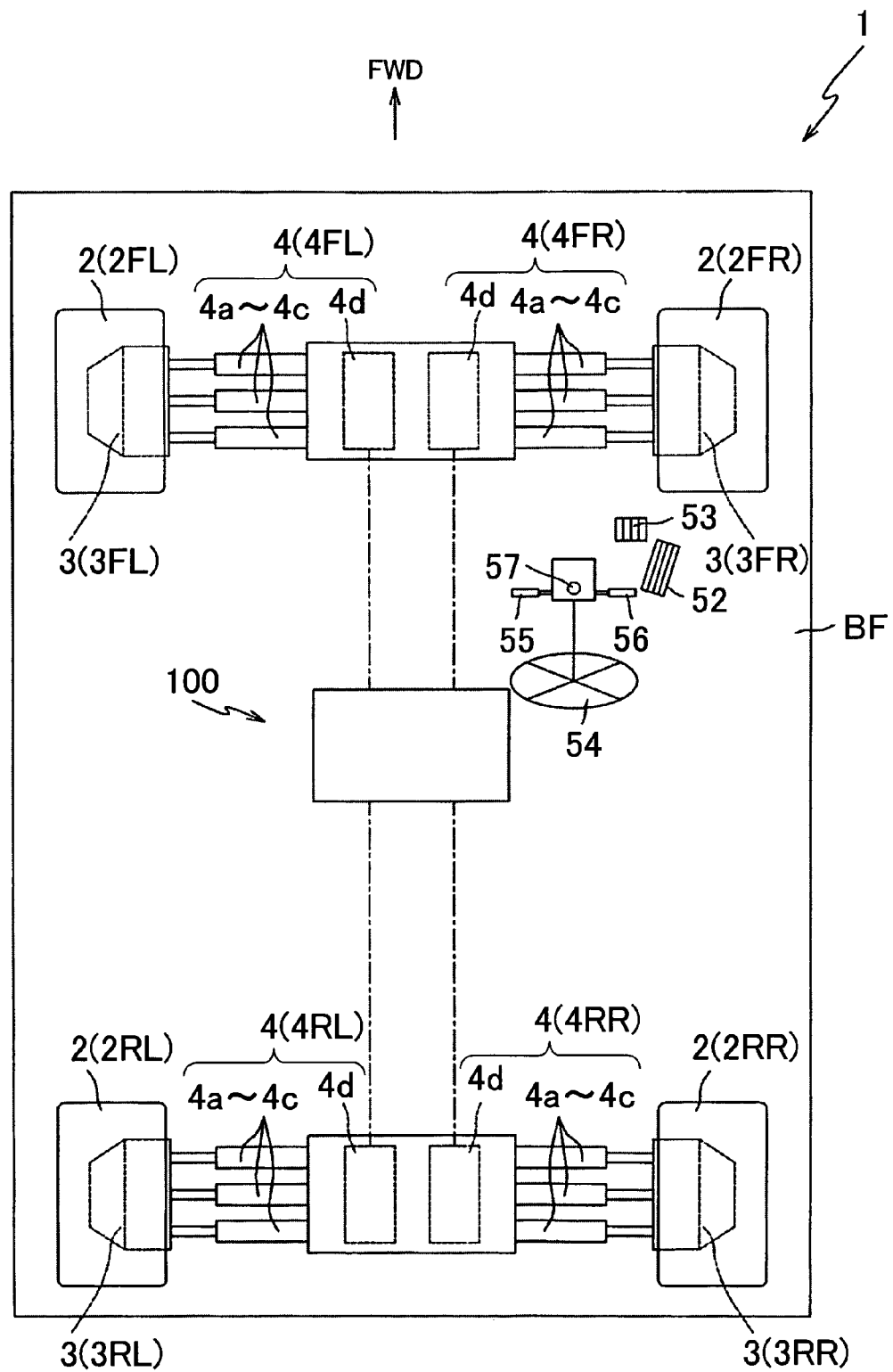
FIG. 1 is a schematic view showing a vehicle in which a vehicle control device according to a first embodiment of the present invention is mounted.

Hereinafter, preferred embodiments of the present invention will be described with reference to the accompanying drawings. FIG. 1 is a schematic view showing a vehicle 1 in which a vehicle control device 100 according to a first embodiment of the present invention is mounted. Note that an arrow FWD in FIG. 1 shows a forward direction of the vehicle 1.

First, the schematic configuration of the vehicle 1 will be described. As shown in FIG. 1, the vehicle 1 mainly includes a body frame BF, a plurality of (four in this embodiment) wheels 2 supported by the body frame BF, a wheel drive device 3 which rotatably drives each wheel 2 independently, and a camber angle adjustment device 4 which performs steering drive, adjustment of a camber angle, and the like of each wheel 2. The vehicle 1 is configured to achieve an improvement in driving performance and fuel saving by controlling the camber angle of the wheel 2 by the vehicle control device 100 and distinctly using two types of treads provided on the wheel 2 (see FIGS. 5 and 6).

Next, the detailed configuration of each portion will be described. As shown in FIG. 1, the wheels 2 include four wheels of left and right front wheels 2FL and 2FR located on the forward side in the proceeding direction of the vehicle 1 and left and right rear wheels 2RL and 2RR located on the rear side in the proceeding direction. The front and rear wheels 2FL to 2RR are configured to be independently rotatable by a rotational driving force provided by the wheel drive devices 3.

The wheel drive device 3 is a rotational driving device for rotatably driving each wheel 2 independently, and is configured by arranging four electric motors (FL motor 3FL to RR motor 3RR) in the respective wheels 2 (that is, as in-wheel motors), as shown in FIG. 1. In the case where a driver operates an accelerator pedal 52, the rotational driving force is applied to each wheel 2 from each wheel drive device 3, whereby each wheel 2 is rotated at a rotational speed according to the operation amount of the accelerator pedal 52.

The wheel 2 (front and rear wheels 2FL to 2RR) is configured such that the steering angle and the camber angle can be adjusted by the camber angle adjustment device 4. The camber angle adjustment device 4 is a drive device for adjusting the steering angle and the camber angle of each wheel 2, and a total of four (FL actuator 4FL to RR actuator 4RR) are arranged in positions corresponding to the respective wheels 2, as shown in FIG. 1.

For example, in the case where the driver operates a steering wheel 54, a part (for example, only the front wheels 2FL and 2FR side) or all of the camber angle adjustment devices 4 are driven, whereby the steering angle in accordance with the operation amount of the steering wheel 54 is applied to the wheel 2. Accordingly, a steering operation of the wheel 2 is performed, whereby the vehicle 1 turns in a predetermined direction.

The vehicle control device 100 performs activation control of the camber angle adjustment device 4 to adjust the camber angle of the wheel 2 in accordance with a change in the driving state of the vehicle 1 (for example, whether being driven at a constant speed or being accelerated/decelerated, or whether proceeding straight or turning), a change in the state of a road surface G (for example, whether the road surface is dry or the road surface is wet due to rain) on which the wheels 2 are driven, and the like.

Figure 2A:
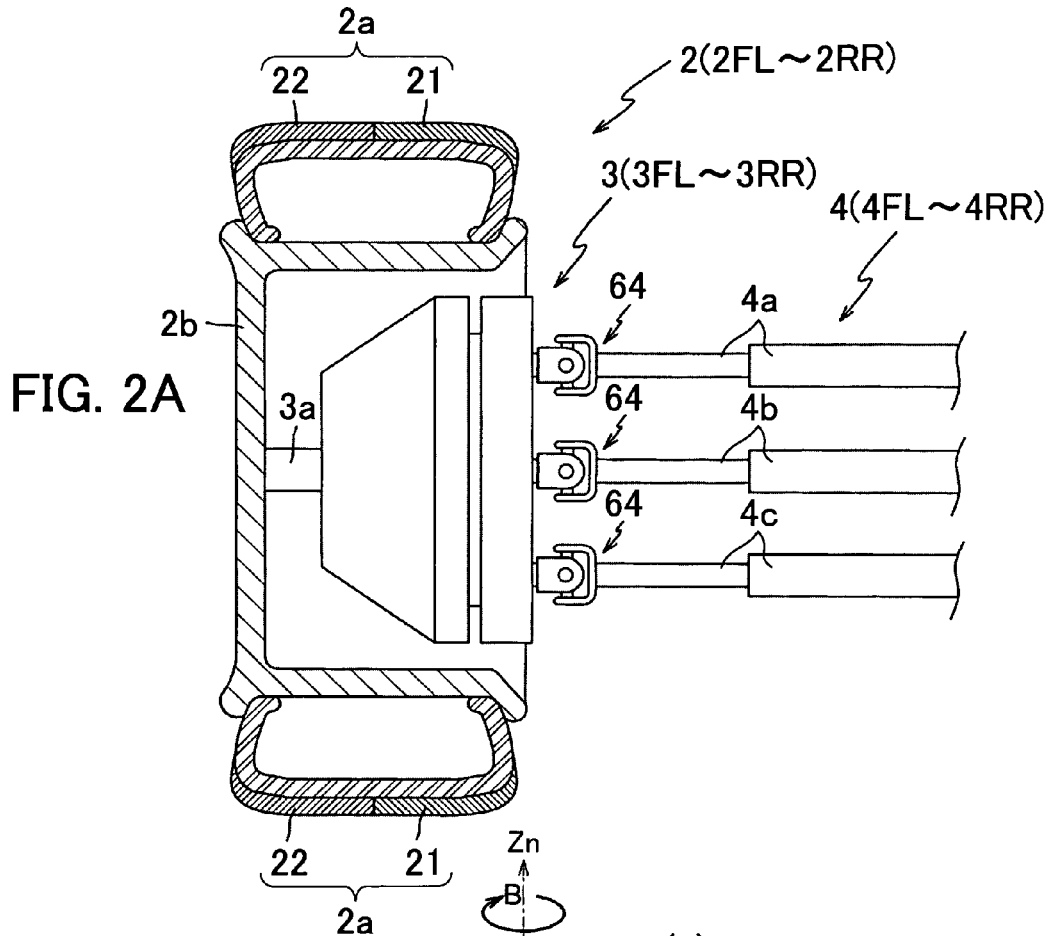
FIG. 2A is sectional view of a wheel.
Figure 2B:
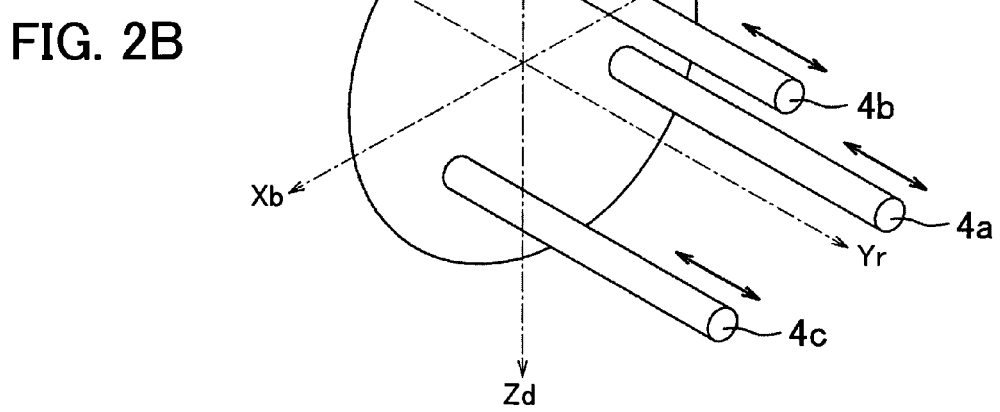
FIG. 2B is a schematic view illustrating an adjustment method of a steering angle and a camber angle of the wheel.

Referring to FIG. 2, the detailed configurations of the wheel drive device 3 and the camber angle adjustment device 4 will be described. FIG. 2A is a sectional view of the wheel 2, and FIG. 2B is a schematic view showing an adjustment method of the steering angle and the camber angle of the wheel 2.

Note that, in FIG. 2A, a power supply wiring and the like for supplying driving voltage to the wheel drive device 3 are omitted in the drawing. In FIG. 2B, a virtual axis Xf-Xb, a virtual axis Yl-Yr, and a virtual axis Zu-Zd respectively correspond to the longitudinal direction, the horizontal direction, and the vertical direction of the vehicle 1.

As shown in FIG. 2A, the wheel 2 (front and rear wheels 2FL to 2RR) mainly includes a tire 2a formed of a rubber elastic material and a wheel rim 2b formed of an aluminum alloy or the like, and the wheel drive device 3 (FL motor 3FL to RR motor 3RR) is arranged as an in-wheel motor in an inner circumference portion of the wheel rim 2b.

The tire 2a includes a first tread 21 arranged on the inside of the vehicle 1 (right side in FIG. 2A) and a second tread 22 having a different characteristic from the first tread 21 and arranged on the outside of the vehicle 1 (left side in FIG. 2A).

Note that the detailed configuration of the wheel 2 (tire 2a) will be described later with reference to FIG. 4.

In the wheel drive device 3, as shown in FIG. 2A, a drive shaft 3a protruding on the front surface side thereof (left side in FIG. 2A) is connected and fixed to the wheel rim 2b, whereby the rotational driving force can be transmitted to the wheel 2 via the drive shaft 3a. On the back surface of the wheel drive device 3, the camber angle adjustment device 4 (FL actuator 4FL to RR actuator 4RR) is connected and fixed.

The camber angle adjustment device 4 includes a plurality of (three in this embodiment) hydraulic pressure cylinders 4a to 4c, and rod portions of the three hydraulic pressure cylinders 4a to 4c are connected and fixed to the back surface side (right side in FIG. 2A) of the wheel drive device 3 via a joint portion (universal joint in this embodiment) 64. Note that, as shown in FIG. 2B, the respective hydraulic pressure cylinders 4a to 4c are arranged at approximately equal intervals in the circumference direction (that is, at 120° intervals in the circumference direction), and the hydraulic pressure cylinder 4b is arranged on the virtual axis Zu-Zd.

Accordingly, by the respective hydraulic pressure cylinders 4a to 4c driving the respective rod portions to extend or contract by predetermined lengths in predetermined directions, the wheel drive device 3 is swingably driven about the virtual axes Xf-Xb and Zu-Zd as the center of the swing, whereby a predetermined camber angle and steering angle are given to each wheel 2 as a result.

For example, as shown in FIG. 2B, when the rod portion of the hydraulic pressure cylinder 4b is driven to contract and the rod portions of the hydraulic pressure cylinders 4a and 4c are driven to extend in a state where the wheels 2 are in neutral positions (state where the vehicle 1 is proceeding straight), the wheel drive device 3 is rotated around the virtual axis Xf-Xb (as shown by an arrow A in FIG. 2B), whereby a camber angle (angle formed by a center line of the wheel 2 with respect to the virtual axis Zu-Zd) in a minus direction (as a negative camber) is given to the wheel 2. On the other hand, when the hydraulic pressure cylinder 4b and the hydraulic pressure cylinders 4a and 4c are respectively driven to extend or contract in the opposite directions, a camber angle in a plus direction (as a positive camber) is given to the wheel 2.

When the rod portion of the hydraulic pressure cylinder 4a is driven to contract and the rod portion of the hydraulic pressure cylinder 4c is driven to extend in the state where the wheels 2 are in the neutral positions (state where the vehicle 1 is proceeding straight), the wheel drive device 3 is rotated about the virtual axis Zu-Zd (as shown by an arrow B in FIG. 2B), whereby a steering angle in a toe-in direction (which is an angle formed by the center line of the wheel 2 with respect to a reference line of the vehicle 1 and is an angle determined regardless of the proceeding direction of the vehicle 1) is given to the wheel 2. On the other hand, when the hydraulic pressure cylinder 4a and the hydraulic pressure cylinder 4c are driven to extend or contract in the opposite directions, a steering angle in a toe-out direction is given to the wheel 2.

Note that the driving methods of the respective hydraulic pressure cylinders 4a to 4c exemplified herein are described for the case of driving from the state where the wheels 2 are in the neutral positions as described above. By combining the driving methods to control the extension/contraction drive of the respective hydraulic pressure cylinders 4a to 4c, an arbitrary camber angle and steering angle can be given to the wheel 2.

Returning to FIG. 1, the accelerator pedal 52 and a brake pedal 53 are operation members operated by the driver. The driving speed and the brake force of the vehicle 1 are determined according to the depression state (such as depression amount or depression speed) of each of the pedals 52 and 53, and the activation control of the wheel drive device 3 is performed.

The steering wheel 54 is an operation member operated by the driver, whereby a turning radius and the like of the vehicle 1 are determined, and the activation control of the camber angle adjustment device 4 is performed according to the operation state (such as rotation angle or rotational speed) thereof. A wiper switch 55 is an operation member operated by the driver. The activation control of a wiper (not shown) is performed according to the operation state (such as operation position) thereof.

In the same manner, a turn signal switch 56 and a high grip switch 57 are operation members operated by the driver. The activation control of a turn signal (not shown) is performed in the case of the former and the activation control of the camber angle adjustment device 4 is performed in the case of the latter according to the operation states (such as operation positions) thereof.

Note that a state where the high grip switch 57 is turned on corresponds to a state where high grip performance is selected as the characteristic of the wheel 2, and a state where the high grip switch 57 is turned off corresponds to a state where low rolling resistance is selected as the characteristic of the wheel 2.

The vehicle control device 100 is a vehicle control device for controlling the respective portions of the vehicle 1 configured in a manner described above, and controls the rotational speed of each wheel 2 by detecting the operation state of each of the pedals 52 and 53 and activating the wheel drive device 3 according to the detection result thereof.

Alternatively, the operation states of the accelerator pedal 52, the brake pedal 53, and the steering wheel 54 are detected, the camber angle adjustment device 4 is activated according to the detection results thereof, and the camber angle of each wheel is adjusted, whereby the two types of treads 21 and 22 provided on the wheel 2 are used distinctly (see FIGS. 5 and 6) to achieve an improvement in the driving performance and fuel saving. The detailed configuration of the vehicle control device 100 will now be described with reference to FIG. 3.

Figure 3:
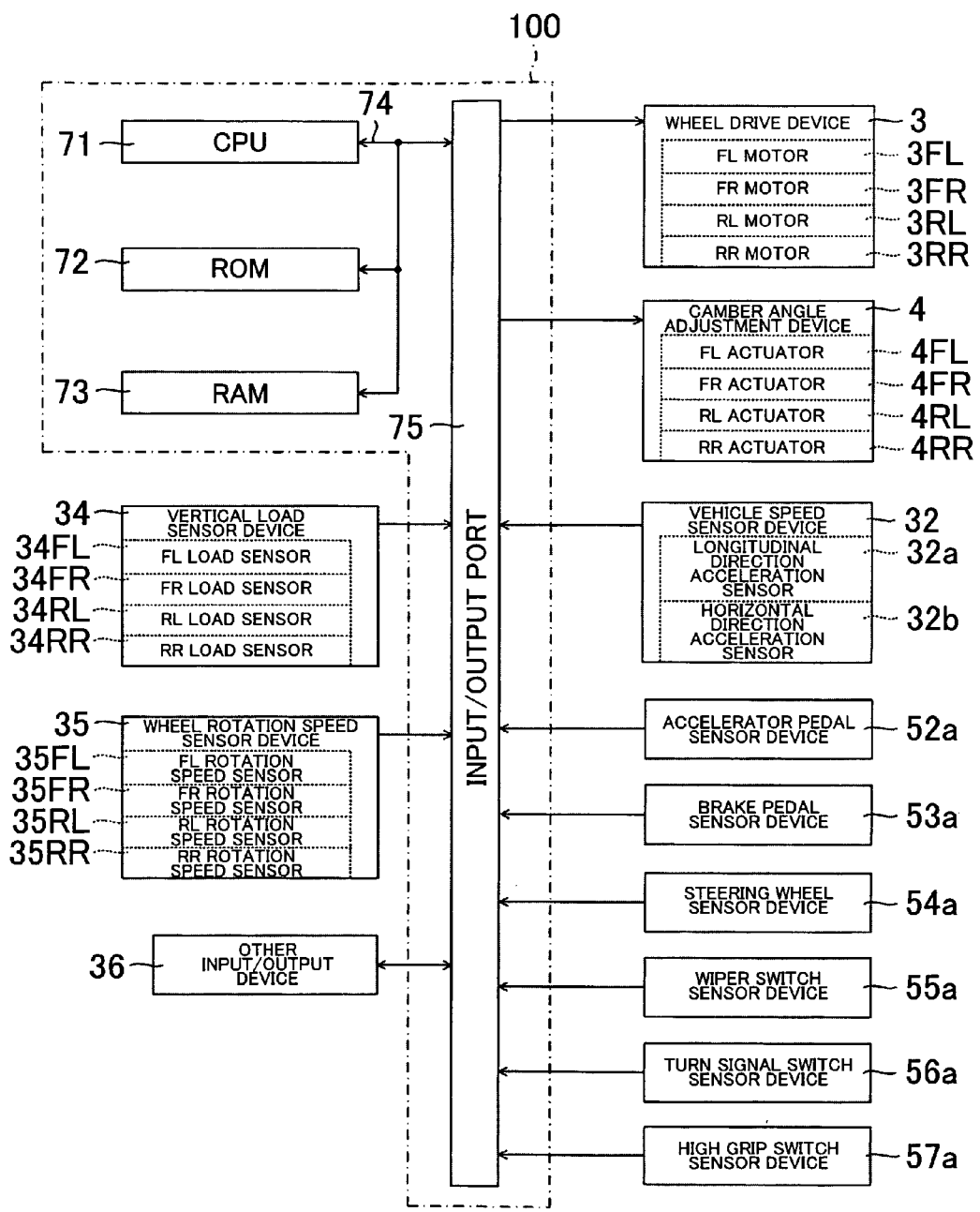
FIG. 3 is a block diagram showing the electrical configuration of the vehicle control device.

FIG. 3 is a block diagram showing the electrical configuration of the vehicle control device 100. As shown in FIG. 3, the vehicle control device 100 includes a CPU 71, a ROM 72, and a RAM 73, which are connected to an input/output port 75 via a bus line 74. A plurality of devices such as the wheel drive device 3 are connected to the input/output port 75.

Figure 7:
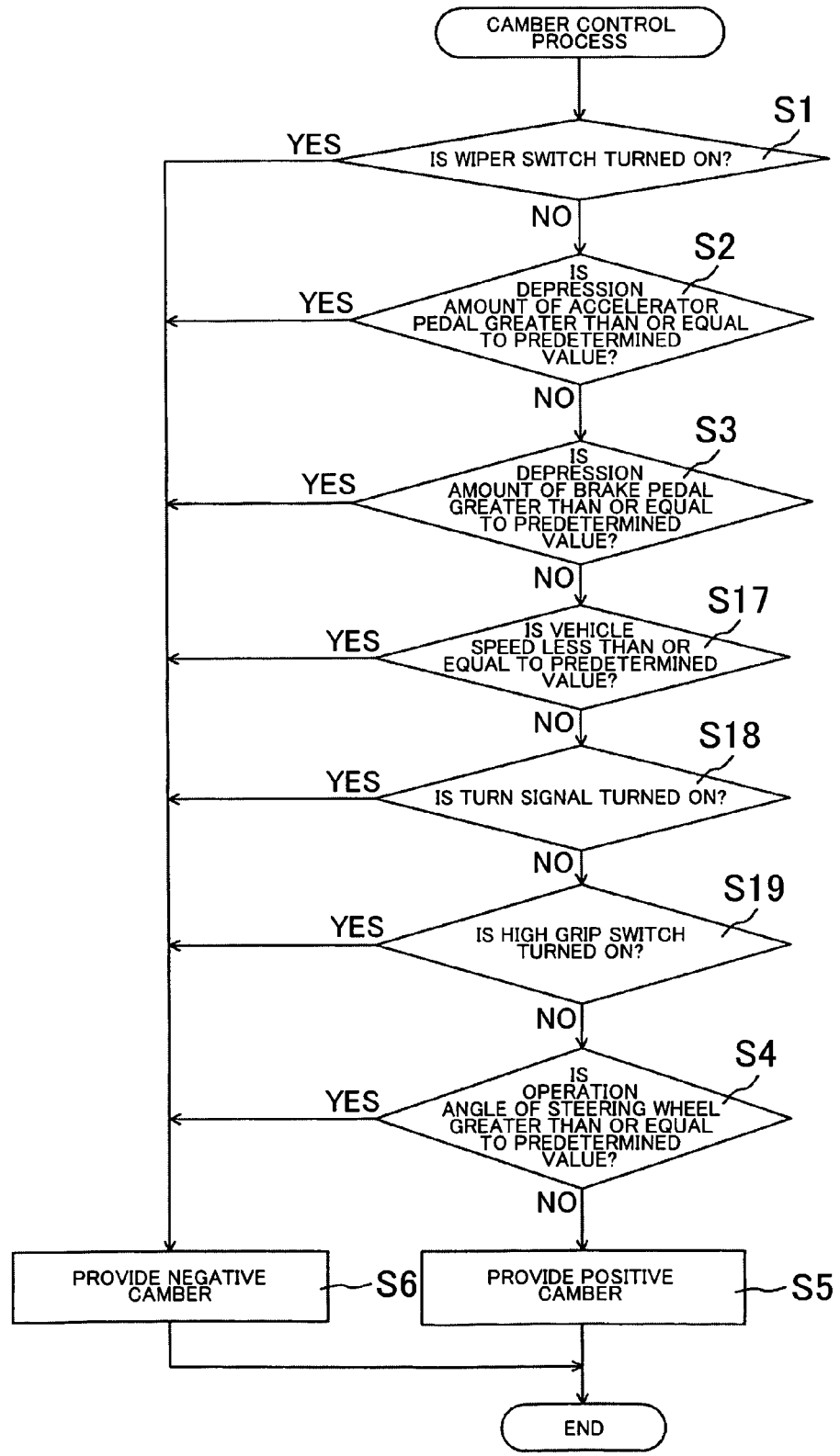
FIG. 7 is a flowchart showing a camber control process.

The CPU 71 is an arithmetic unit which controls the respective portions connected by the bus line 74. The ROM 72 is a non-rewritable nonvolatile memory storing a control program executed by the CPU 71, fixed value data, and the like. The RAM 73 is a memory for storing various rewritable data at the time of executing the control program. Note that, in the ROM 72, a program of a flowchart (camber control process) shown in FIG. 7 is stored.

As described above, the wheel drive device 3 is a device for rotatably drives each wheel 2 (see FIG. 1), and mainly includes the four motors, i.e., the FL motor 3FL to the RR motor 3RR, which provide rotational driving force to the respective wheels 2 and a driving circuit (not shown) which performs drive control of the respective motors 3FL to 3RR based on a command from the CPU 71.

As described above, the camber angle adjustment device 4 is a drive device for adjusting the steering angle and the camber angle of each wheel 2. The camber angle adjustment device 4 mainly includes the four actuators, i.e., the FL actuator 4FL to the RR actuator 4RR, which provide the driving force for angle adjustments of the respective wheels 2 (wheel drive devices 3), and a driving circuit (not shown) which performs drive control of the respective actuators 4FL to 4RR based on a command from the CPU 71.

Note that the FL actuator 4FL to the RR actuator 4RR mainly include the three hydraulic pressure cylinders 4a to 4c, a hydraulic pressure pump 4d (see FIG. 1) which supplies oil (hydraulic pressure) to the respective hydraulic pressure cylinders 4a to 4c, an electromagnetic valve (not shown) which switches the supply direction of the oil supplied from the hydraulic pressure pump to the respective hydraulic pressure cylinders 4a to 4c, and an extension/contraction sensor (not shown) which detects the extension/contraction amount of the respective hydraulic pressure cylinders 4a to 4c (rod portions).

When the driving circuit of the camber angle adjustment device 4 performs the drive control of the hydraulic pressure pump based on a command from the CPU 71, the respective hydraulic pressure cylinders 4a to 4c are driven to extend or contract by the oil (hydraulic pressure) supplied from the hydraulic pressure pump. When the electromagnetic valve is turned on/off, the driving direction (extension or contraction) of the respective hydraulic pressure cylinders 4a to 4c is switched.

The driving circuit of the camber angle adjustment device 4 monitors the extension/contraction amount of the respective hydraulic pressure cylinders 4a to 4c through the extension/contraction sensor, and the extension/contraction drive of the hydraulic pressure cylinders 4a to 4c which have reached a target value (extension/contraction amount) instructed by the CPU 71 is stopped. Note that the detection result by the extension/contraction sensor is output from the driving circuit to the CPU 71, and the CPU 71 can obtain the current steering angle and the camber angle of each wheel 2 based on the detection result.

A vehicle speed sensor device 32 is a device for detecting a ground speed (absolute value and proceeding direction) of the vehicle 1 with respect to the road surface G and outputting the detection result to the CPU 71. The vehicle speed sensor device 32 mainly includes a longitudinal direction acceleration sensor 32a, a horizontal direction acceleration sensor 32b, and a control circuit (not shown) which processes the detection results of the respective acceleration sensors 32a and 32b and outputs them to the CPU 71.

The longitudinal direction acceleration sensor 32a is a sensor which detects the acceleration of the vehicle 1 (body frame BF) in the longitudinal direction (vertical direction in FIG. 1), and the horizontal direction acceleration sensor 32b is a sensor which detects the acceleration of the vehicle 1 (body frame BF) in the horizontal direction (left-right direction in FIG. 1). Note that, in this embodiment, the respective acceleration sensors 32a and 32b are configured as piezoelectric sensors using a piezoelectric element.

The CPU 71 can time-integrate the detection results (acceleration values) of the respective acceleration sensors 32a and 32b input from the control circuit of the vehicle speed sensor device 32 to calculate the respective speeds in the two directions (longitudinal and horizontal directions), and obtain the ground speed (absolute value and proceeding direction) of the vehicle 1 by synthesizing the components in the two directions.

A vertical load sensor device 34 is a device for detecting the load applied to the ground contact area of each wheel 2 from the road surface G and outputting the detection result to the CPU 71. The vertical load sensor device 34 includes an FL load sensor 34FL to an RR load sensor 34RR which respectively detect the loads applied to the respective wheels 2 and a processing circuit (not shown) which processes the detection results of the respective FL load sensor 34FL to RR load sensor RR and outputs them to the CPU 71.

Note that, in this embodiment, the respective load sensors 34FL to 34RR are configured as piezoresistive three-shaft load sensors. The respective load sensors 34FL to 34RR are arranged on a suspension shaft (not shown) of the respective wheels 2, and detect the loads applied to the wheels 2 described above from the road surface G in three directions of the longitudinal direction (virtual axis Xf-Xb direction), the horizontal direction (virtual axis Yl-Yr direction), and the vertical direction (virtual axis Zu-Zd direction) of the vehicle 1 (see FIG. 2B).

The CPU 71 estimates a friction coefficient μ of the road surface G in the ground contact area of each wheel 2 in the following manner from the detection result (vertical load) of the each of the load sensors 34FL to 34RR input from the vertical load sensor device 34.

For example, looking at the front wheel 2FL, if the loads in the longitudinal direction, the horizontal direction, and the vertical direction of the vehicle 1 detected by the FL load sensor 34FL are respectively Fx, Fy, and Fz, the friction coefficient μ of the road surface G in a portion corresponding to the ground contact area of the front wheel 2FL in the longitudinal direction of the vehicle 1 is Fx/Fz (μx=Fx/Fz) in a slip state where the front wheel 2FL is slipping with respect to the road surface G, and is estimated to be a larger value than Fx/Fz (μx>Fx/Fz) in a non-slip state where the front wheel 2FL is not slipping with respect to the road surface G.

Note that a friction coefficient μy in the horizontal direction of the vehicle 1 is shown as μy=Fy/Fz in the slip state and is estimated to be larger than Fy/Fz in the non-slip state in the same manner. The friction coefficient μ can obviously be detected by other methods. Examples of other methods include known technology disclosed in Japanese Patent Application Publication No. JP-A-2001-315633 and Japanese Patent Application Publication No. JP-A-2003-118554.

A wheel rotation speed sensor device 35 is a device for detecting the rotational speed of each wheel 2 and outputting the detection result to the CPU 71. The wheel rotation speed sensor device 35 includes four rotation sensors, i.e., an FL rotation sensor speed 35FL to an RR rotation speed sensor 35RR, which respectively detect the rotational speeds of the respective wheels 2 and a processing circuit (not shown) which processes the detection results of the respective rotation speed sensors 35FL to 35RR and outputs them to the CPU 71.

Note that, in this embodiment, the respective rotation speed sensors 35FL to 35RR are provided on the respective wheels 2, and detect the angular speeds of the respective wheels 2 as the rotational speeds. That is, the respective rotation speed sensors 35FL to 35RR are configured as electromagnetic pickup sensors including a rotation body which rotates in conjunction with each wheel 2 and a pickup which electromagnetically detects the presence or absence of a lot of teeth formed in the circumference direction of the rotation body.

The CPU 71 can obtain the actual circumference speed of each wheel 2 from the rotational speed of each wheel 2 input from the wheel rotation speed sensor device 35 and the outer diameter of each wheel 2 stored in the ROM 72 in advance, and can determine whether each wheel 2 is slipping by comparing the circumference speed thereof and the driving speed (ground speed) of the vehicle 1.

An accelerator pedal sensor device 52a is a device for detecting the operation state of the accelerator pedal 52 and outputting the detection result thereof to the CPU 71. The accelerator pedal sensor device 52a mainly includes an angle sensor (not shown) which detects the depression state of the accelerator pedal 52 and a control circuit (not shown) which processes the detection result of the angle sensor and outputs it to the CPU 71.

A brake pedal sensor device 53a is a device for detecting the operation state of the brake pedal 53 and outputting the detection result thereof to the CPU 71. The brake pedal sensor device 53a mainly includes an angle sensor (not shown) which detects the depression state of the brake pedal 53 and a control circuit which processes the detection result of the angle sensor and outputs it to the CPU 71.

A steering wheel sensor device 54a is a device for detecting the operation state of the steering wheel 54 and outputting the detection result thereof to the CPU 71. The steering wheel sensor device 54a mainly includes an angle sensor (not shown) which detects the operation state of the steering wheel 54 and a control circuit (not shown) which processes the detection result of the angle sensor and outputs it to the CPU 71.

A wiper switch sensor device 55a is a device for detecting the operation state of the wiper switch 55 and outputting the detection result thereof to the CPU 71. The wiper switch sensor device 55a mainly includes a positioning sensor (not shown) which detects the operation state (operation position) of the wiper switch 55 and a control circuit (not shown) which processes the detection result of the positioning sensor and outputs it to the CPU 71.

A turn signal switch sensor device 56a is a device for detecting the operation state of the turn signal switch 56 and outputting the detection result thereof to the CPU 71. The turn signal switch sensor device 56a mainly includes a positioning sensor (not shown) which detects the operation state (operation position) of the turn signal switch 56 and a control circuit (not shown) which processes the detection result of the positioning sensor and outputs it to the CPU 71.

A high grip switch sensor device 57a is a device for detecting the operation state of the high grip switch 57 and outputting the detection result thereof to the CPU 71. The high grip switch sensor device 57a mainly includes a positioning sensor (not shown) which detects the operation state (operation position) of the high grip switch 57 and a control circuit (not shown) which processes the detection result of the positioning sensor and outputs it to the CPU 71.

Note that, in this embodiment, the respective angle sensors are configured as contact-type potentiometers using electrical resistance. The CPU 71 can obtain the depression amount of each of the pedals 52 and 53 and the operation angle of the steering wheel 54 from the detection results input from the control circuits of the respective sensor devices 52a to 54a, and obtain the depression speed (operation speed) of each of the pedals 52 and 53 and the rotational speed (operation speed) of the steering wheel 54 by time-integrating the detection results.

Examples of other input/output device 36 shown in FIG. 3 include a rainfall sensor which detects rainfall or an optical sensor which detects the state of the road surface G without contact.

Figure 5:
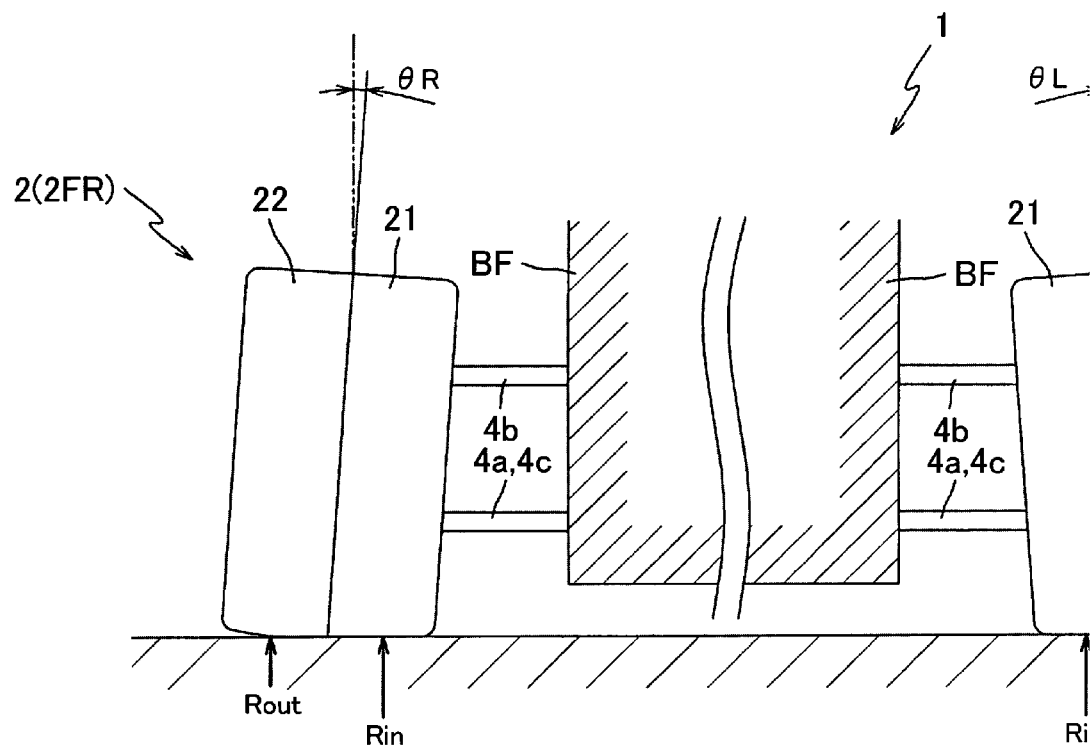
FIG. 5 is a schematic view; showing a front view of the vehicle in a state where the wheel is provided with a negative camber.
Figure 6:
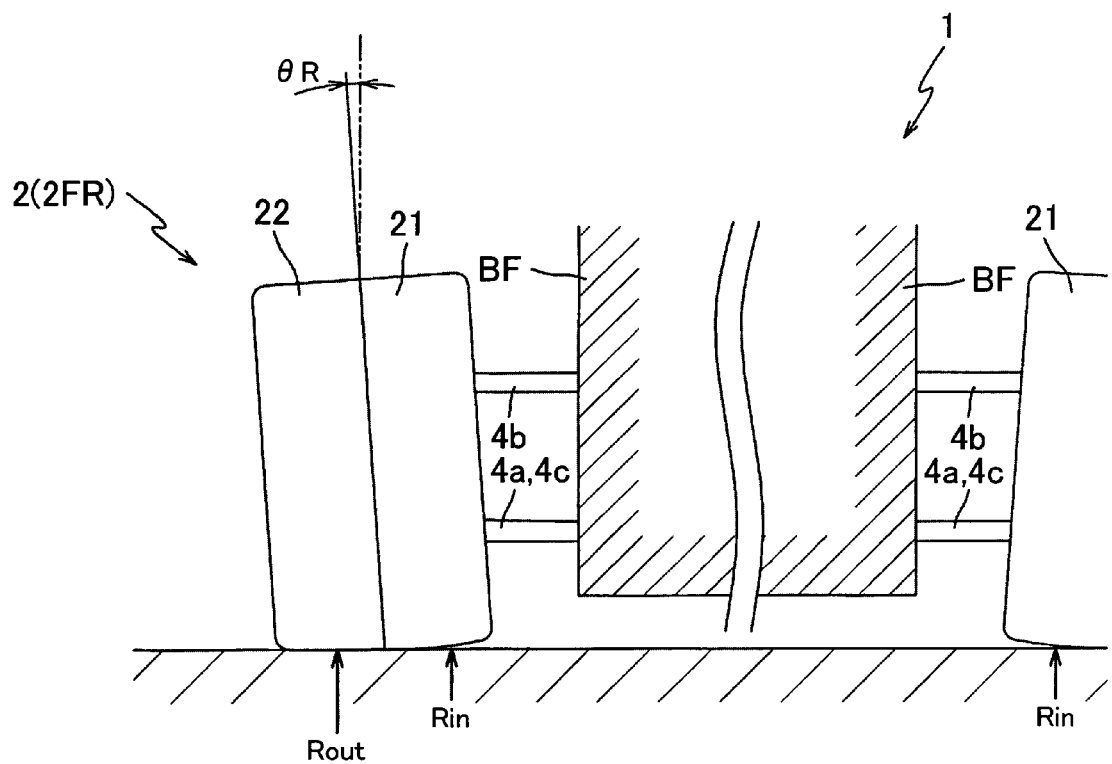
FIG. 6 is a schematic view schematically showing a front view of the vehicle in a state where the wheel is provided with a positive camber.

Next, the detailed configuration of the wheel 2 will be described with reference to FIGS. 4 to 6. FIG. 4 is a schematic view showing the top view of the vehicle 1. FIGS. 5 and 6 are schematic views showing the front view of the vehicle 1. FIG. 5 shows a state where the wheel 2 is provided with a negative camber, and FIG. 6 shows a state where the wheel 2 is provided with a positive camber.

As described above, the wheel 2 includes two types of treads, the first tread 21 and the second tread 22. As shown in FIG. 4, in each of the wheels 2 (front wheels 2FL and 2FR, and rear wheels 2RL and 2RR), the first tread 21 is arranged on the inside of the vehicle 1, and the second tread 22 is arranged on the outside of the vehicle 1.

Figure 4:
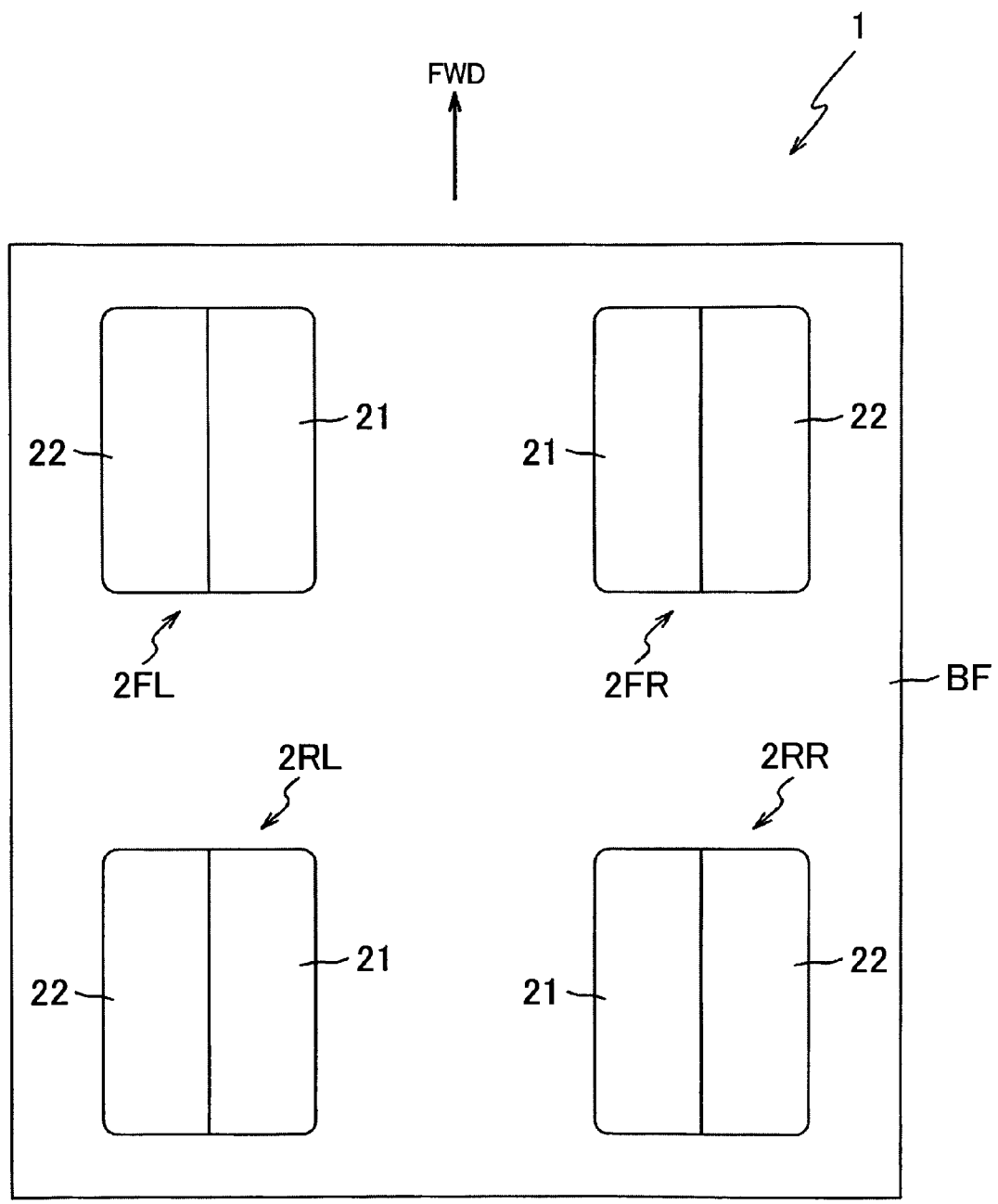
FIG. 4 is a schematic view showing a top view of the vehicle.

In this embodiment, the two treads 21 and 22 are configured to have the same width dimensions (dimensions in the horizontal direction in FIG. 4). The first tread 21 is configured to have a characteristic of a higher grip force (higher grip performance) compared to the second tread 22. On the other hand, the second tread 22 is configured to have a characteristic of a smaller rolling resistance (lower rolling resistance) compared to the first tread 21.

For example, when the activation control of the camber angle adjustment device 4 is performed and camber angles θL and θR of the wheels 2 are adjusted in the minus direction (as negative cambers) as shown in FIG. 5, a ground contact pressure Rin of the first tread 21 arranged on the inside of the vehicle 1 is increased and a ground contact pressure Rout of the second tread 22 arranged on the outside of the vehicle 1 is decreased. Accordingly, by leveraging the high grip performance of the first tread 21, the driving performance (for example, the turning performance, the acceleration performance, the brake performance, or vehicle stability in the rain) can be improved.

On the other hand, when the activation control of the camber angle adjustment device 4 is performed and camber angles θL and θR of the wheels 2 are adjusted in the plus direction (positive camber direction) as shown in FIG. 6, the ground contact pressure on the first tread 21 arranged on the inside of the vehicle 1 is decreased and the ground contact pressure on the second tread 22 arranged on the outside of the vehicle 1 is increased. Accordingly, by leveraging the low rolling resistance of the second tread 22, the fuel saving performance can be improved.

Next, a camber brake control will be described with reference to FIG. 7. FIG. 7 is a flowchart showing a camber control process. This process is a process executed repeatedly (for example, at intervals of 0.2 ms) by the CPU 71 while the power of the vehicle control device 100 is applied. Thus, the compatibility between two performances of the driving performance and the fuel saving performance described above is provided by adjusting the camber angle given to the wheel 2.

In the camber control process, the CPU 71 first determines whether the wiper switch 55 is turned on, i.e., whether a wiping operation of a wiper for a windshield is instructed by the driver (S1). In the case where it is determined that the wiper switch 55 is turned on as a result (S1: Yes), it is estimated that there is a possibility that the current weather is rainy and a water film is formed on the road surface G. Therefore, the negative camber is provided to the wheel 2 (S6) to terminate the camber process.

Accordingly, the ground contact pressure Rin of the first tread 21 is increased and the ground contact pressure Rout of the second tread 22 is decreased (see FIG. 5). Therefore, the vehicle stability in the rain can be improved by leveraging the high grip performance of the first tread 21.

In the case where it is determined that the wiper switch 55 is not turned on in the process of S1 (S1: No), it is estimated that it is not rainy and the state of the road surface G is good. Then, whether the depression amount of the accelerator pedal 52 is greater than or equal to a predetermined value, i.e., whether an acceleration of a predetermined level or greater (sudden acceleration) is instructed by the driver, is determined (S2).

In the case where it is determined that the depression amount of the accelerator pedal 52 is greater than or equal to the predetermined value as a result (S2: Yes), the sudden acceleration is instructed by the driver and the wheel 2 may slip. Therefore, the negative camber is provided to the wheel 2 (S6) to terminate the camber process.

Accordingly, in the same manner as the case described above, the ground contact pressure Rin of the first tread 21 is increased and the ground contact pressure Rout of the second tread 22 is decreased (see FIG. 5). Therefore, a slip of the wheel 2 can be prevented by leveraging the high grip performance of the first tread 21. Thus, the acceleration performance of the vehicle 1 can be improved.

In the case where it is determined that the depression amount of the accelerator pedal 52 does not reach the predetermined value in the process of S2 (S2: No), the sudden acceleration is not instructed and it is estimated as moderate acceleration or constant-speed driving. Then, it is determined whether the depression amount of the brake pedal 53 is greater than or equal to a predetermined value, i.e., whether a brake of a predetermined level or greater (sudden brake) is instructed by the driver (S3).

In the case where it is determined that the depression amount of the brake pedal 53 is greater than or equal to the predetermined value as a result (S3: Yes), the sudden brake is instructed by the driver and the wheel 2 may lock. Therefore, the negative camber is provided to the wheel 2 (S6) to terminate the camber process.

Accordingly, in the same manner as the case described above, the ground contact pressure Rin of the first tread 21 is increased and the ground contact pressure Rout of the second tread 22 is decreased (see FIG. 5). Therefore, a lock of the wheel 2 can be prevented by leveraging the high grip performance of the first tread 21. Thus, the brake performance of the vehicle 1 can be improved.

In the case where it is determined that the depression amount of the brake pedal 53 does not reach the predetermined value in the process of S3 (S3: No), the sudden brake is not instructed and it is estimated as moderate brake or constant-speed driving. Then, it is determined whether the vehicle speed (ground speed) is less than or equal to a predetermined value (for example, 15 km per hour), i.e., whether it is a low-speed driving (S17).

In the case where it is determined that the vehicle speed is less than or equal to the predetermined value (that is, in the low-speed driving) as a result (S17: Yes), there is a higher possibility that the vehicle 1 then decelerates to stop or accelerates, as compared a case where the vehicle speed exceeds the predetermined value. Accordingly, in such cases, it is necessary to ensure the grip force or the stopping force of the vehicle 1 (wheel 2). Therefore, the negative camber is provided to the wheel 2 (S6) to terminate the camber process.

Accordingly, in the same manner as the case described above, the ground contact pressure Rin of the first tread 21 is increased and the ground contact pressure Rout of the second tread 22 is decreased (see FIG. 5). Therefore, a lock or a slip of the wheel 2 can be prevented by leveraging the high grip performance of the first tread 21 and thereby increasing the grip force of the wheel 2. As a result, the brake performance and the acceleration performance of the vehicle 1 can be improved.

Since the stopping force of the vehicle 1 (wheel 2) can be ensured by leveraging the high grip performance of the first tread 21 after the vehicle 1 is stopped, the vehicle 1 can be stopped in a stable state. Further, in the case of restarting after the stop, the ground contact pressure Rin is increased in advance. Accordingly, the wheel 2 can be prevented from slipping, and the restart of the vehicle 1 can be performed smoothly and promptly.

In the case where it is determined that the vehicle speed is higher than the predetermined value in the process of S17

(S17: No), the vehicle speed is not low and it is estimated that the driving force or brake force at the time of acceleration or deceleration has a relatively small value. Then, it is determined whether the turn signal switch 56 is turned on, i.e., whether a right or left turn or a lane change is instructed by the driver (S18).

In the case where it is determined that the turn signal switch 56 is turned on as a result (S18: Yes), there is a high possibility that turning operation of the vehicle 1 or deceleration as a preparation therefor is performed along with the right or left turn or the lane change. Accordingly, the negative camber is provided to the wheel 2 (S6) to terminate the camber process.

Thus, in the same manner as the case described above, the ground contact pressure Rin of the first tread 21 is increased and the ground contact pressure Rout of the second tread 22 is decreased (see FIG. 5). Therefore, a slip of the wheel 2 can be prevented by leveraging the high grip performance of the first tread 21, and the turning performance of the vehicle 1 can be improved.

In the case where it is determined that the turn signal switch 56 is not turned on in the process of S18 (S18: No), it is estimated that the turning operation of the vehicle 1 along with the right or left turn or the lane change is not performed. Then, it is determined whether the high grip switch 57 is turned on, i.e., whether the selection of the high grip performance as the characteristic of the wheel 2 is instructed by the driver (S19).

In the case where it is determined that the high grip switch 57 is turned on as a result (S19: Yes), the high grip performance is selected as the characteristic of the wheel 2. Therefore, the negative camber is provided to the wheel 2 (S6) to terminate the camber process.

Accordingly, in the same manner as the case described above, the ground contact pressure Rin of the first tread 21 is increased and the ground contact pressure Rout of the second tread 22 is decreased (see FIG. 5). Therefore, a slip of the wheel 2 can be prevented by leveraging the high grip performance of the first tread 21. As a result, the brake performance, the acceleration performance, or the turning performance of the vehicle 1 can be improved.

In the case where it is determined that the high grip switch 57 is not turned on in the process of S19 (S19: No), it is then determined whether the operation angle of the steering wheel 54 is greater than or equal to a predetermined value, i.e., whether a turn of a predetermined level or greater (tight turn) is instructed by the driver (S4).

In the case where it is determined that the operation angle of the steering wheel 54 is greater than or equal to the predetermined value as a result (S4: Yes), the tight turn is instructed by the driver and the wheel 2 may slip to spin the vehicle 1. Therefore, the negative camber is provided to the wheel 2 (S6) to terminate the camber process.

Thus, in the same manner as the case described above, the ground contact pressure Rin of the first tread 21 is increased and the ground contact pressure Rout of the second tread 22 is decreased (see FIG. 5). Therefore, a slip of the wheel 2 (spin of the vehicle 1) can be prevented by leveraging the high grip performance of the first tread 21. As a result, the turning performance of the vehicle 1 can be improved.

On the other hand, in the case where it is determined that the operation angle of the steering wheel 54 does not reach the predetermined value in the process of S4 (S4: No), the tight turn is not instructed and it is estimated that a moderate turn or a straight-ahead driving will be performed, and that the road surface is in a good state and the sudden acceleration or the sudden brake is not instructed based on the processes of S1 to S3 (S1: No, S2: No, S3: No).

Thus, in this case (S1: No, S2: No, S3: No, S4: No, S5: No), it can be determined that it is not necessary to obtain the high grip performance as the performance of the wheel 2 and that it is preferable to obtain the fuel saving performance by the low rolling resistance. Therefore, the positive camber is provided to the wheel 2 (S5) to terminate the camber process.

Accordingly, the ground contact pressure Rin of the first tread 21 is decreased and the ground contact pressure Rout of the second tread 22 is increased (see FIG. 6). Therefore, the rolling efficiency of the wheel 2 can be improved by leveraging the low rolling resistance of the second tread 22, and the fuel saving performance of the vehicle 1 can be improved.

In this manner, in this embodiment, the compatibility can be provided between the two performances, i.e., the acceleration performance as well as the brake performance and the fuel saving performance which conflict with each other, by adjusting the camber angles θR and θL of the wheel 2 by the camber angle adjustment device 4 to change the ratio of the ground contact pressure Rin in the first tread 21 and the ground contact pressure Rout in the second tread 22.

Next, a second embodiment of the present invention will be described with reference to FIGS. 8 to 11. FIG. 8 is a top view of a wheel 202 of the second embodiment, and FIG. 9 is a schematic view showing a top view of a vehicle 201.

Figure 10:
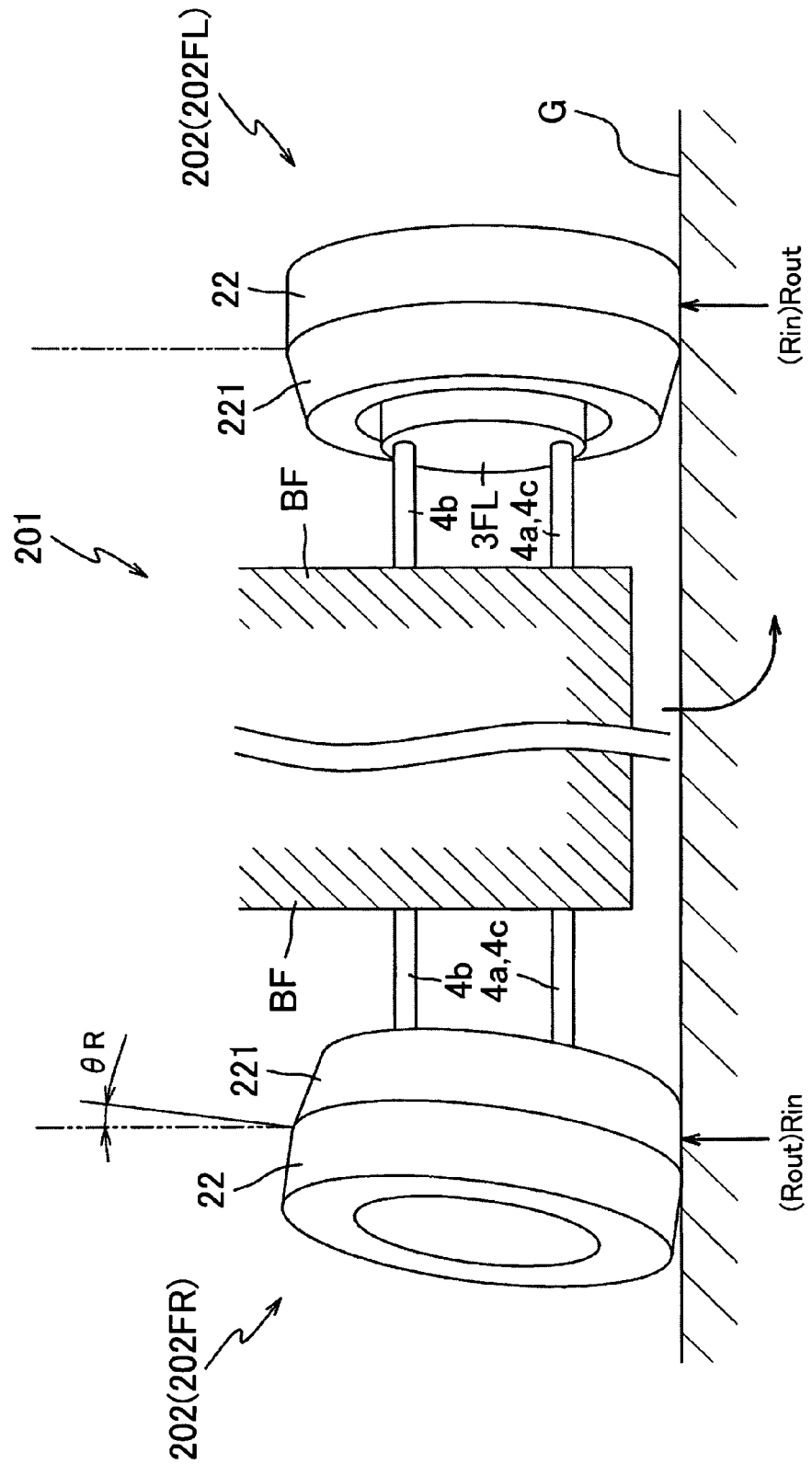
FIG. 10 is a schematic view showing a front view of the vehicle making a left turn in a state where left and right wheels are provided with steering angles for a left turn, a turning outer wheel (right front wheel) is provided with a negative camber, and a turning inner wheel (left wheel) is provided with a constant camber angle, respectively.

FIG. 10 is a schematic view showing a front view of the vehicle 201 making a left turn in a state where the left and right wheels 202 are provided with steering angles for a left turn, the turning outer wheel (right front wheel 202FR) is provided with a negative camber, and the turning inner wheel (left wheel 202FL) is provided with a constant camber angle.

In the first embodiment, the case where the outer diameters of the two treads 21 and 22 of the wheel 2 are constant in the width direction has been described, but the wheel 202 of the second embodiment is configured such that the outer diameter of a first tread 221 is gradually decreased. Note that the same portions as those of the first embodiment described above are denoted by the same reference numerals, and descriptions thereof will be omitted.

Figure 9:
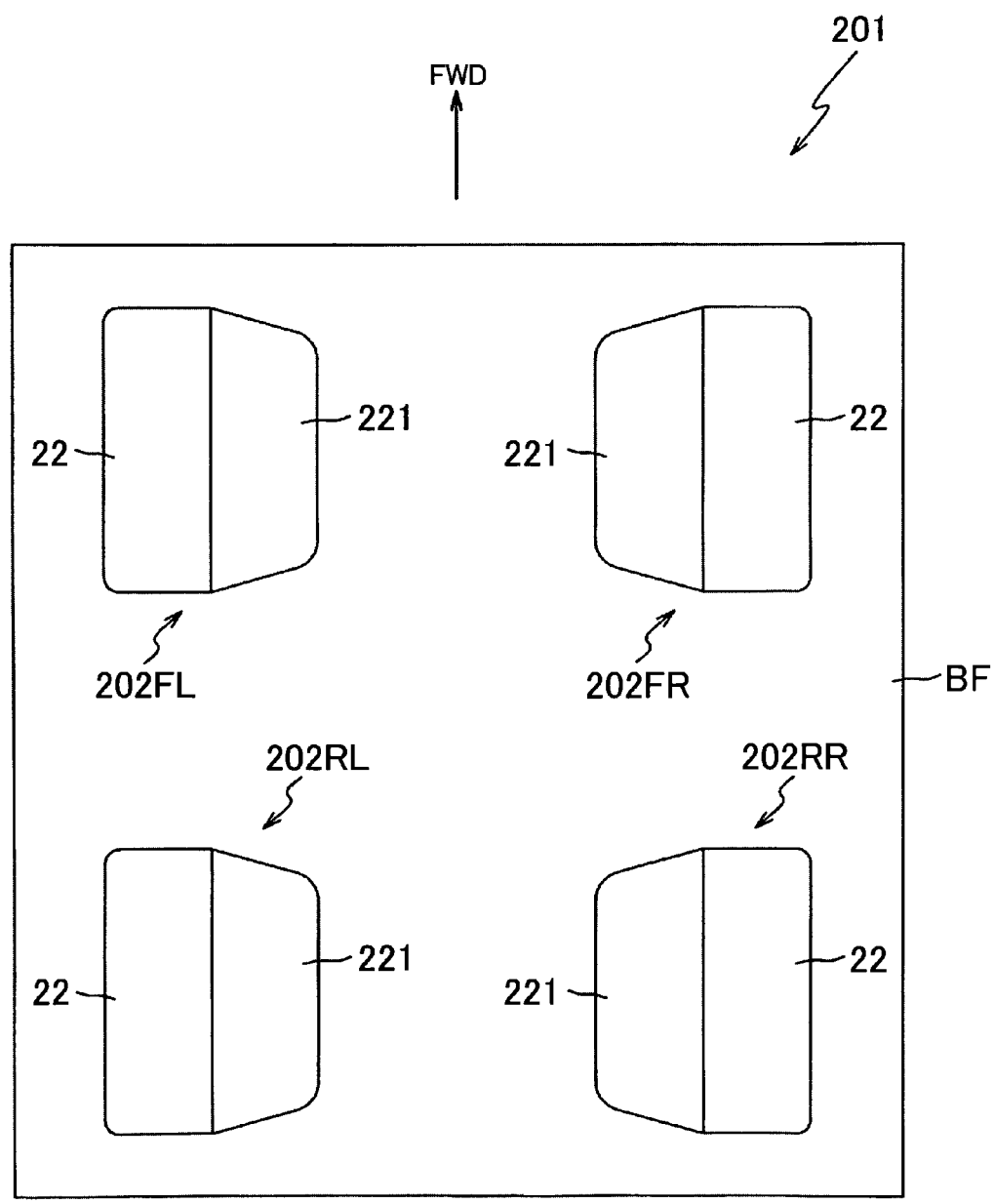
FIG. 9 is a schematic view showing a top view of a vehicle.

As shown in FIGS. 8 and 9, the wheel 202 of the second embodiment includes the first tread 221 arranged on the inside of the vehicle 201 (right side in FIG. 8) and the second tread 22 having a different characteristic from the first tread 221 and arranged on the outside of the vehicle 201 (left side in FIG. 8).

Note that the first tread 221 is configured to have a characteristic of a higher grip force (higher grip performance) compared to the second tread 22, and the second tread 22 is configured to have a characteristic of a smaller rolling resistance (lower rolling resistance) compared to the first tread 221.

As shown in FIGS. 8 and 9, although the wheel 202 is configured such that the width dimensions (dimensions in the horizontal direction in FIG. 8) of the two treads 221 and 22 are the same, the second tread 22 is configured to have an outer diameter approximately constant in the width direction (horizontal direction in FIG. 8) while the first tread 221 is configured to have an outer diameter which gradually decreases from the second tread 22 side (left side in FIG. 8) toward the inside of the vehicle 201 (right side in FIG. 8).

Accordingly, as shown in FIG. 10, only the second tread 22 can be caused to contact the ground in a state where the first tread 221 does not contact the road surface G even if a large camber angle is not provided (i.e., the camber angle is set to 0°) in the wheel 202 (left front wheel 202FL). As a result, the rolling resistance of the entire wheel 202 can be reduced to further improve the fuel saving performance. Simultaneously, the first tread 221 does not contact the ground and the second tread 22 contacts the ground at a smaller camber angle, so that the wear of the two treads 221 and 22 can be suppressed to achieve a longer service life.

In the case where the camber angle in the minus direction (negative camber) is provided to the wheel 202 (right front wheel 202FR) to cause the first tread 221 to contact the ground as shown in FIG. 10, the ground contact pressure on the first tread 221 can be made uniform in the entire region in the width direction (horizontal direction in FIG. 8) because the outer diameter of the first tread 221 is gradually decreased. Thus, a concentration of the ground contact pressure on a tread end portion can be suppressed.

Therefore, by using the first tread 221 having the high grip performance efficiently, the driving performance (such as the turning performance, the acceleration performance, the brake performance, and driving stability in the rain) can further be improved, and a biased wear of the first tread 221 can be suppressed to achieve a longer service life.

Figure 11:
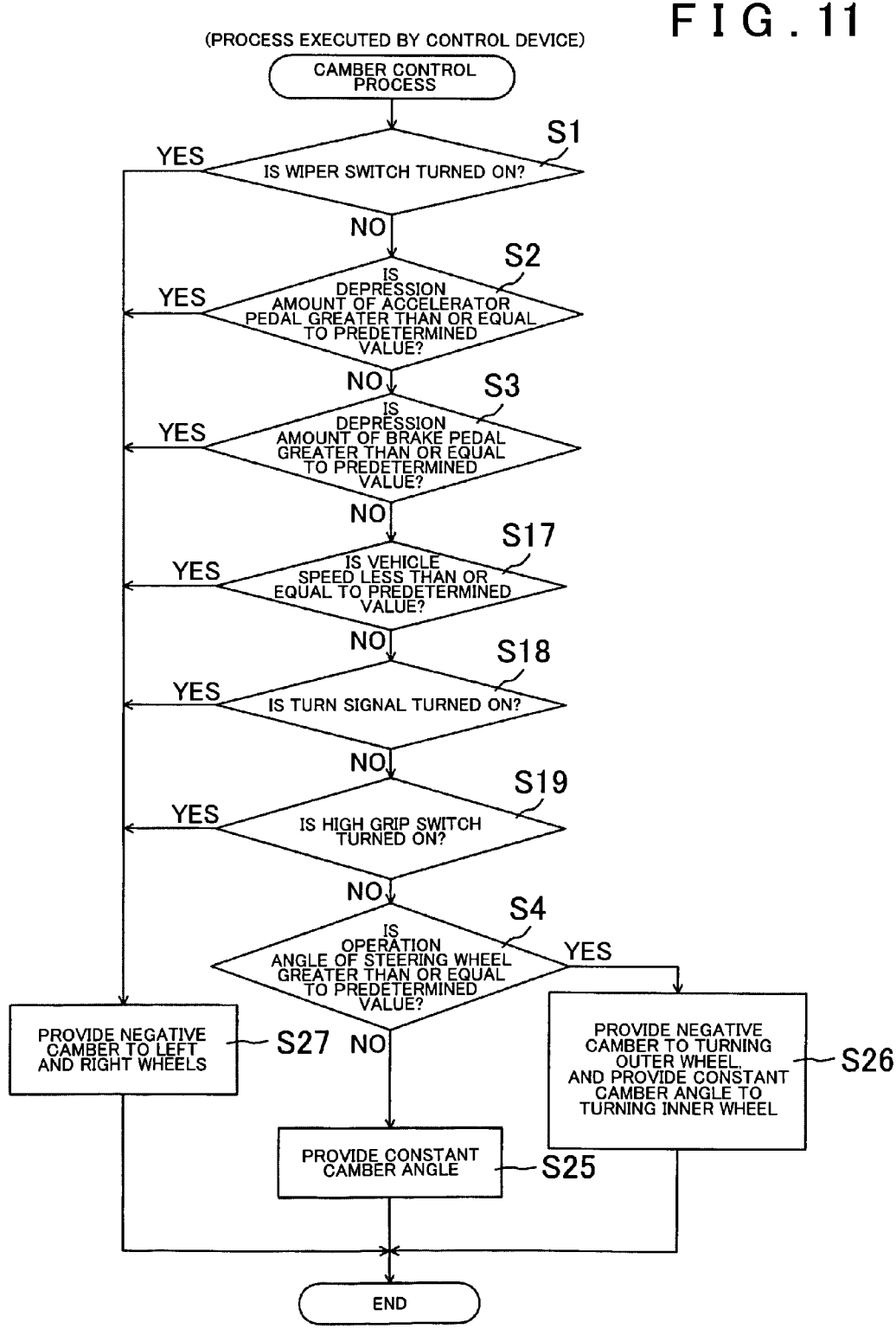
FIG. 11 is a flowchart showing a camber control process.

Next, the camber brake control of the second embodiment will be described with reference to FIG. 11. FIG. 11 is a flowchart showing the camber control process.

In the camber control process performed by the CPU 71, if it is determined that the wiper switch 55 is turned on (S1: Yes), if it is determined that the depression amount of the accelerator pedal 52 is greater than or equal to the predetermined value (S1: No, S2: Yes), if it is determined that the depression amount of the brake pedal 53 is greater than or equal to the predetermined value (S1: No, S2: No, S3: Yes), if it is determined that the vehicle speed is less than or equal to the predetermined value (S1: No, S2: No, S3: No, S17: Yes), if it is determined that the turn signal switch 56 is turned on (S1: No, S2: No, S3: No, S17: No, S18: Yes), or if it is determined that the high grip switch 57 is turned on (S1: No, S2: No, S3: No, S17: No, S18: No, S19: Yes), the water film is formed on the road surface G, the sudden acceleration or sudden brake is instructed, a generation of large driving force or stopping of the vehicle is expected, the turning operation along with the right or left turn or the lane change is expected, or the selection of the high grip performance is instructed, as described above in the first embodiment. Therefore, it is necessary to leverage the high grip performance of the first tread 221.

Thus, in this case, the negative cambers (camber angles at which at least the second tread 22 is made distant from the road surface G in this embodiment, see the right front wheel 202FR shown in FIG. 10) are provided to the left and right wheels 202 (S27) to terminate the camber process.

Accordingly, in the same manner as the case of the first embodiment described above, the ground contact pressure Rin of the first tread 221 is increased and the ground contact pressure Rout of the second tread 22 is decreased (the ground contact pressure Rout becomes zero in this embodiment). Therefore, a slip or lock of the wheel 202 can be prevented by leveraging the high grip performance of the first tread 221, and driving stability and the acceleration/brake performance of the vehicle 201 can be improved.

Note that the camber angles θR and θL provided to the left and right wheels 202 are preferably the same angle during the straight-ahead driving. The camber angles θR and θL are preferably angles larger than that at which the second tread 22 is made distant from the road surface G.

In the case where it is determined that the operation angle of the steering wheel 54 does not reach the predetermined value in the process of S4 (S4: No), the tight turn is not instructed, and it is estimated that a moderate turn or a straight-ahead driving will be performed, and that the road surface is in a good state, the sudden acceleration or the sudden brake is not instructed, the generation of a large driving force or stopping of the vehicle is not expected, the turning operation along with the right or left turn or the lane change is not expected, and further, the selection of the high grip performance is not instructed, based on the processes of S1 to S3 and S17 to S19 (S1: No, S2: No, S3: No, S17: No, S18: No, S19: No).

Thus, in this case (S1: No, S2: No, S3: No, S17: No, S18: No, S19: No, S4: No), it can be determined that it is not necessary to obtain the high grip performance as the performance of the wheel 202 and that it is preferable to obtain the fuel saving performance by the low rolling resistance. Therefore, the constant camber angle is given to the wheel 202 (S25) to terminate the camber process. Note that, in this embodiment, the constant camber angle is set to 0° (see the left front wheel 202FL shown in FIG. 10).

Accordingly, only the second tread 22 can be caused to contact the ground in the state where the first tread 221 does not contact the road surface G. Therefore, the rolling resistance of the entire wheel 202 can be reduced to further improve the fuel saving performance. In this case, the first tread 221 does not contact the ground and the second tread 22 contacts the ground at the camber angle of 0°, whereby the wear of the two treads 221 and 22 can be suppressed to achieve a longer service life.

In the case where it is determined that the operation angle of the steering wheel 54 is greater than or equal to the predetermined value in the process of S4 (S4: Yes), the tight turn is instructed by the driver. Accordingly, the wheel 202 may slip to spin the vehicle 201. Thus, in this embodiment, the negative camber is provided to the turning outer wheel (right front wheel 202FR in FIG. 10) and the constant camber angle is provided (S26) to the turning inner wheel (left front wheel 202FL in FIG. 10) to terminate the camber process.

Accordingly, the cost for the control drive can be reduced while ensuring the turning performance. That is, because the ground contact pressure Rin of the first tread 221 is increased and the ground contact pressure Rout of the second tread 22 is reduced (to zero in this embodiment) in the turning outer wheel (see FIG. 10), a slip of the wheel 202 (spin of the vehicle 201) can be prevented by leveraging the high grip performance of the first tread 221, and the turning performance of the vehicle 201 can be improved. On the other hand, by making the change of the camber angle in the turning inner wheel smaller than that of the turning outer wheel (that is, maintaining the camber angle during the straight-ahead driving), the cost of the control by the vehicle control device 100 or the cost of the drive by the camber angle adjustment device 4 can be reduced.

Figure 12:
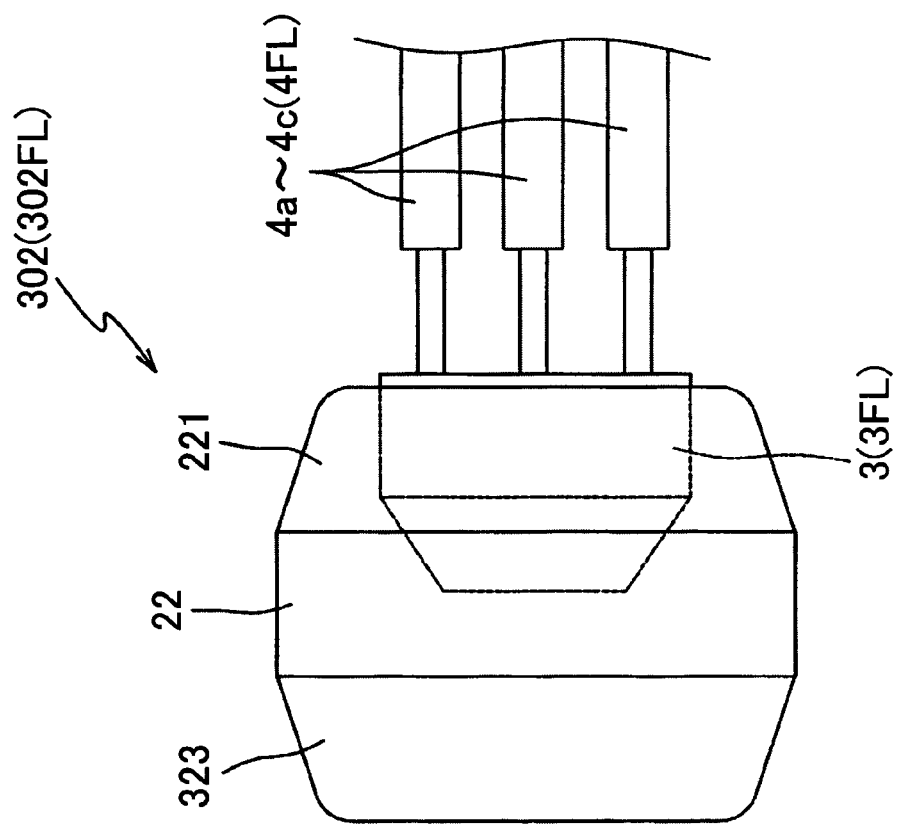
FIG. 12 is a top view of a wheel according to a third embodiment of the present invention.
Figure 13:
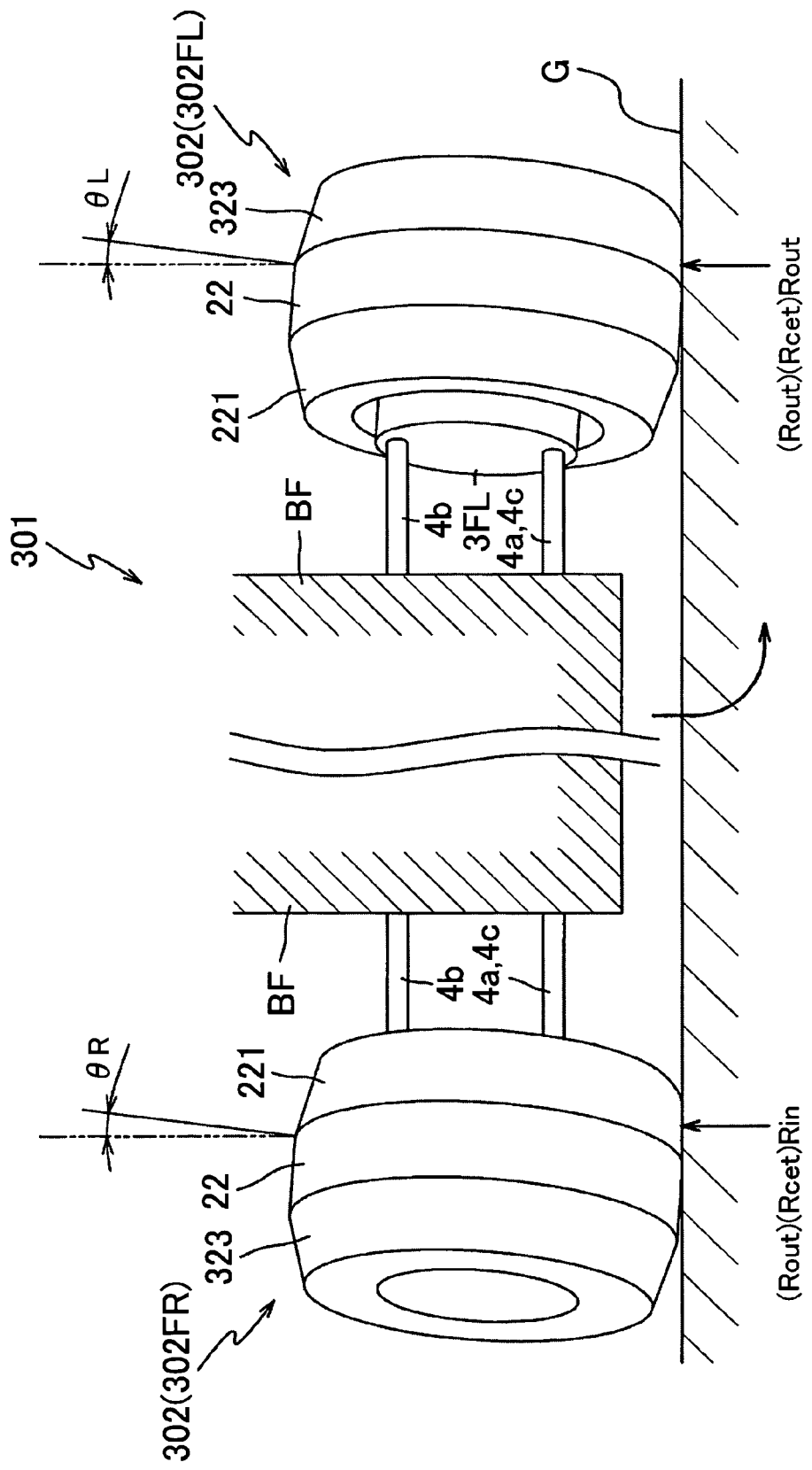
FIG. 13 is a schematic view showing a front view of a vehicle making a left turn in a state where left and right wheels are provided with steering angles for a left turn, a turning outer wheel (right front wheel) is provided with a negative camber, and a turning inner wheel (left wheel) is provided with a positive camber, respectively.

Next, a third embodiment of the present invention will be described with reference to FIGS. 12 to 14. FIG. 12 is a top view of a wheel 302 of the third embodiment. FIG. 13 is a schematic view showing a front view of a vehicle 301 making a left turn. In FIG. 13 shows a state where the left and right wheels 302 are provided with steering angles for a left turn, a turning outer wheel (right front wheel 302FR) is provided with the negative camber, and a turning inner wheel (left wheel 302FL) is provided with the positive camber.

In the first embodiment, the case where the outer diameters of the two treads 21 and 22 of the wheel 2 are constant in the width direction has been described, but the wheel 302 of the third embodiment is configured such that the outer diameter of a first tread 221 and the outer diameter of a third tread 323 are gradually decreased. Note that the same portions as those of the respective embodiments described above are denoted by the same reference numerals, and descriptions thereof will be omitted.

As shown in FIG. 12, the wheel 302 of the third embodiment includes the third tread 323, and the first tread 221 is arranged on the inside of the vehicle 301 (right side in FIG. 12), the third tread 323 is arranged on the outside of the vehicle 301 (left side in FIG. 12), and the second tread 22 is arranged between the first tread 221 and the third tread 323.

The third tread 323 is configured to have a characteristic of a higher grip force at least compared to the second tread 22, and the third tread 323 is configured such that the diameter gradually decreases from the second tread 22 side (right side in FIG. 12) toward the outside of the vehicle 301 (left side in FIG. 12), as shown in FIG. 12.

Accordingly, only the second tread 22 can be caused to contact the ground in a state where the first tread 221 and the third tread 323 are apart from the road surface G without providing a large camber angle to the wheel 302 (for example, even if the camber angle is set to 0°). Accordingly, the rolling resistance of the entire wheel 302 can be reduced to further improve the fuel saving performance.

Simultaneously, by the first tread 221 and the third tread 323 not contacting the ground and the second tread 22 contacting the ground at a smaller camber angle, the wear of the respective treads 221, 22, and 323 can be suppressed to achieve a longer service life.

In the case where the camber angle in the plus direction (positive camber) is provided to the wheel 302 to cause the third tread 323 to contact the ground, the ground contact pressure on the third tread 323 can be made uniform in the entire region in the width direction (horizontal direction in FIG. 12) since the outer diameter of the third tread 323 is gradually decreased. Thus, concentration of the ground contact pressure on a tread end portion can be suppressed.

Therefore, by efficiently using the third tread 323 having the high grip performance, the driving performance (such as the turning performance, the acceleration performance, the brake performance, and driving stability in the rain) can further be improved, and the biased wear can be suppressed to achieve a longer service life.

Next, the camber brake control of the third embodiment will be described with reference to FIG. 14. FIG. 14 is a flowchart showing the camber control process.

In the case where the CPU 71 determines that the operation angle of the steering wheel 54 does not reach the predetermined value in the process of S4 (S4: No), the tight turn is not instructed, and it is estimated that a moderate turn or a straight-ahead driving will be performed, and that the road surface is in a good state, the sudden acceleration or the sudden brake is not instructed, the generation of a large driving force or stopping of the vehicle is not expected, the turning operation along with the right or left turn or the lane change is not expected, and further, the selection of the high grip performance is not instructed, based on the processes of S1 to S3 and S17 to S19 (S1: No, S2: No, S3: No, S17: No, S18: No, S19: No).

Thus, in this case (S1: No, S2: No, S3: No, S17: No, S18: No, S19: No, S4: No), it can be determined that it is not necessary to obtain the high grip performance as the performance of the wheel 302 and that it is preferable to obtain the fuel saving performance by the low rolling resistance. Therefore, the constant camber angle is provided to the wheel 302 (S25) to terminate the camber process. Note that, in this embodiment, the constant camber angle is set to 0° (see the left front wheel 202FL shown in FIG. 10).

Thus, only the second tread 22 can be caused to contact the ground in the state where the first tread 221 and the third tread 323 are apart from the road surface G, whereby the rolling resistance of the entire wheel 302 can be reduced to further improve the fuel saving performance. In this case, the first tread 221 and the third tread 323 do not contact the ground and the second tread 22 contacts the ground at the camber angle of 0°, whereby the wear of the respective treads 221, 22, and 323 can be suppressed to achieve a longer service life.

In the case where it is determined that the operation angle of the steering wheel 54 is greater than or equal to the predetermined value in the process of S4 (S4: Yes), the tight turn is instructed by the driver. Accordingly, the wheel 302 may slip to spin the vehicle 301. Thus, in this embodiment, the negative camber is provided to the turning outer wheel (right front wheel 302FR in FIG. 13) and the positive camber is provided (S36) to the turning inner wheel (left front wheel 302FL in FIG. 13) to terminate the camber process.

That is, as shown in FIG. 13, since the camber angles θR and θL are provided such that the left and right wheels 302 are both inclined to the inward side of the turn (right side in FIG. 13) in the process of S36, lateral forces can be applied to the respective left and right wheels 302 to use the lateral forces of the two wheels 302 as the turning force. Thus, the turning performance can further be improved.

Figure 15:
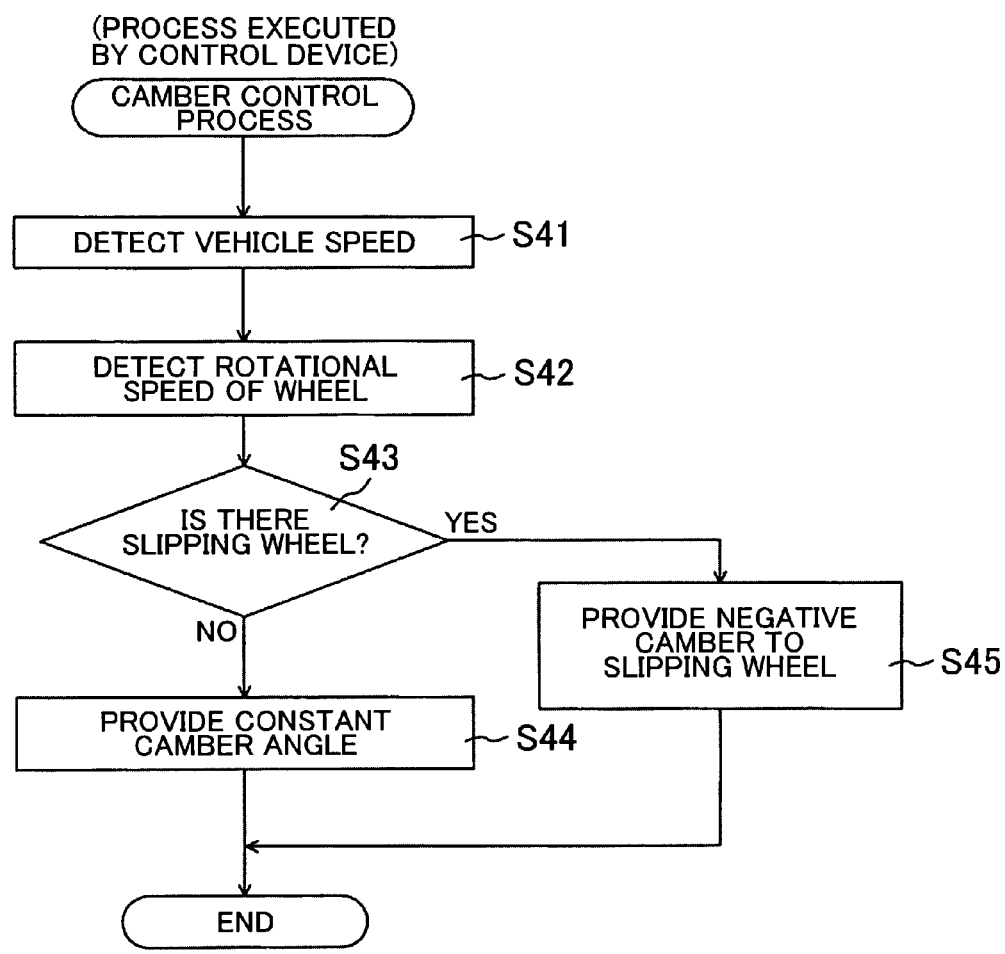
FIG. 15 is a flowchart showing a camber control process according to a fourth embodiment of the present invention.

Next, a fourth embodiment of the present invention will be described with reference to FIG. 15. FIG. 15 is a flowchart showing the camber control process of the fourth embodiment.

In the first embodiment, the case where the camber angle of the wheel 2 is adjusted in the case where, for example, the sudden acceleration or the tight turn is instructed by the driver has been described. However, the fourth embodiment is configured such that the camber angle of the wheel 202 is adjusted in the case where any of the wheels 202 are slipping.

Note that the same portions as the respective embodiments described above are denoted by the same reference numerals, and the descriptions thereof will be omitted. In the fourth embodiment, a case where the vehicle 201 (wheel 202) of the second embodiment is controlled by the vehicle control device 100 will be described as an example.

In the process of S4 of the camber angle, the CPU 71 first detects the vehicle speed (S41), detects the rotational speed (circumferential speed) of the wheel 202 (S42), and determines whether any of the wheel 202 are slipping (S43) based on the vehicle speed and the circumferential speed of the wheel 202. Note that the vehicle speed and the circumferential speed of the wheel 202 is calculated by the vehicle speed sensor device 32 and the wheel rotation speed sensor device 35 as described above.

In the case where it is determined that there is no wheel 202 slipping, i.e., all of the wheels 202 are gripped to the road surface G to be driven, in the process of S43 as a result (S43: No), it can be determined that it is not necessary to obtain the high grip performance as the performance of the wheel 202 and that it is preferable to obtain the fuel saving performance by the low rolling resistance. Therefore, the constant camber angle (0° in the same manner as in the case of the second embodiment) is provided to the wheel 202 (S44) to terminate the camber process.

Accordingly, only the second tread 22 can be caused to contact the ground in the state where the first tread 221 does not contact the road surface G. Accordingly, the rolling resistance of the entire wheel 202 can be reduced to further improve the fuel saving performance. In this case, the first tread 221 does not contact the ground and the second tread 22 contacts the ground at the camber angle of 0°, whereby the wear of the two treads 221 and 22 can be suppressed to achieve a longer service life.

On the other hand, in the case where it is determined that there is a wheel 202 slipping in the process of S43 (S43: Yes), the acceleration performance or the driving stability of the vehicle 201 may be affected. Accordingly, the negative camber is provided to the slipping wheel 202 (S45) to terminate the camber process.

Thus, in the same manner as the case of the first embodiment described above, the ground contact pressure Rin of the first tread 221 is increased and the ground contact pressure Rout of the second tread 22 is decreased (the ground contact pressure Rout becomes zero in this embodiment). Therefore, a slip of the wheel 202 can be prevented by leveraging the high grip performance of the first tread 221, and the acceleration performance and the driving stability of the vehicle 201 can be improved.

In the flowchart (camber control process) shown in FIG. 7, the processes of S5 and S6 correspond to an activation control unit according to a first aspect of the present invention, the process of S17 corresponds to a ground speed determination unit and the process of S6 corresponds to a low-speed-time activation control unit according to a second aspect of the present invention, and the processes of S1, S2, S3, S18, S19, and S4 correspond to an operation state determination unit and the process of S6 corresponds to an operation-time activation control unit according to a third aspect of the present invention, respectively.

In the flowchart (camber control process) shown in FIG. 11, the processes of S25, S26, and S27 correspond to the activation control unit according to the first aspect, the process of S17 corresponds to the ground speed determination unit and the process of S27 corresponds to the low-speed-time activation control unit according to the second aspect, and the processes of S1, S2, S3, S18, S19, and S4 correspond to the operation state determination unit and the processes of S27 and S26 correspond to the operation-time activation control unit according to the third aspect, respectively.

Figure 14:
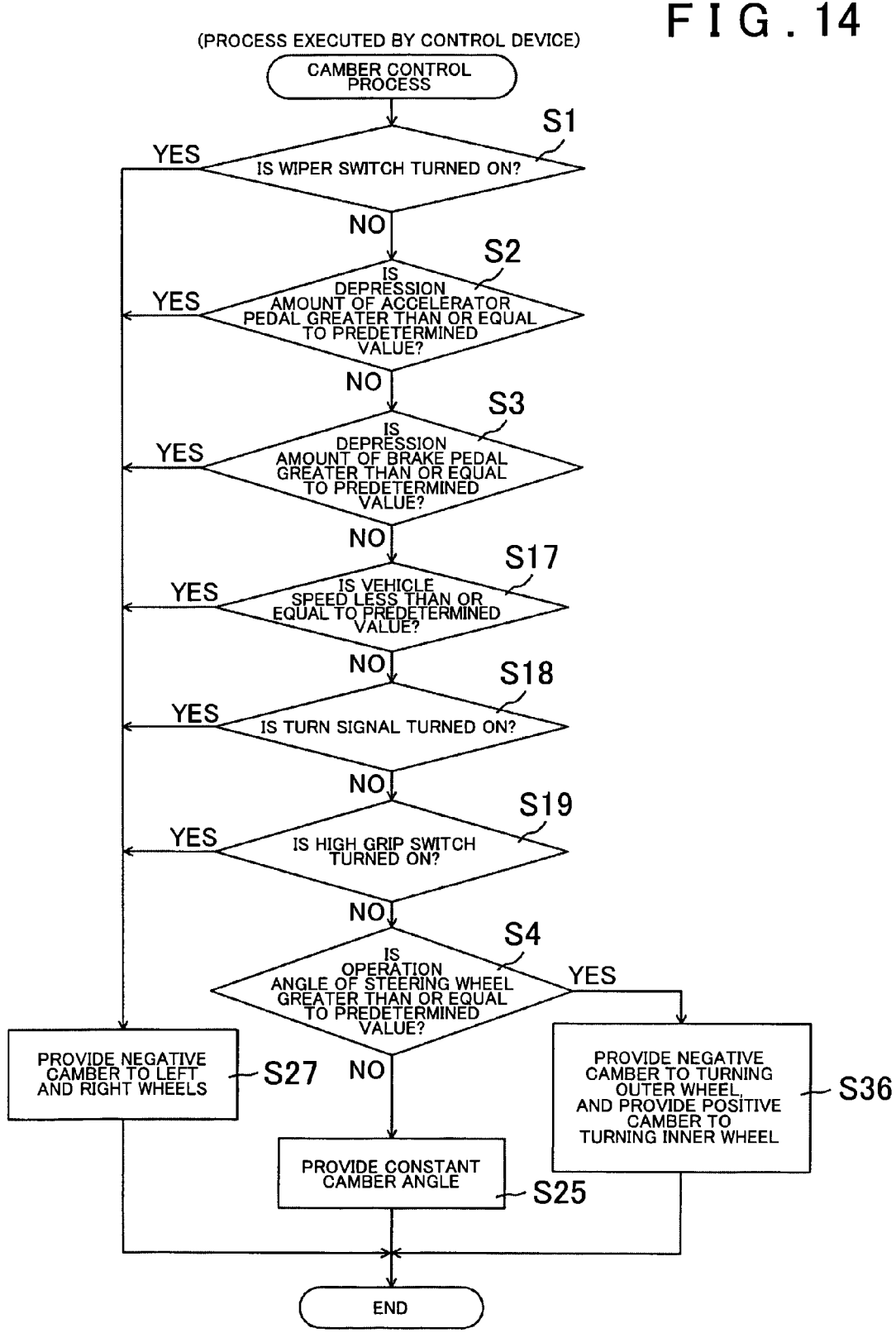
FIG. 14 is a flowchart showing a camber control process.

In the flowchart (camber control process) shown in FIG. 14, the processes of S25, S27, and S36 correspond to the activation control unit according to the first aspect, the process of S17 corresponds to the ground speed determination unit and the process of S27 corresponds to the low-speed-time activation control unit according to the second aspect, and the processes of S1, S2, S3, S18, S19, and S4 correspond to the operation state determination unit and the processes of S27 and S36 correspond to the operation-time activation control unit according to the third aspect, respectively.

In the flowchart (camber control process) shown in FIG. 15, the processes of S44 and S45 correspond to the activation control unit according to the first aspect.

The present invention has been described above based on the embodiments. However, the present invention is not in any way limited to the embodiments described above, and it can easily be expected that various modifications and variations are possible without departing from the gist of the present invention.

For example, values given in the embodiments described above are examples, and other values may obviously be employed.

In the first to third embodiments described above, the case where the negative camber is provided to the wheel in the case where the operation amount (depression amount) of the accelerator pedal 52 or the brake pedal 53 by the driver is greater than or equal to the predetermined value has been described (see S2, S3, and S6 of FIG. 7). However, it is not necessarily limited thereto, and it may obviously be configured such that the camber angle of the wheel is determined based on other state quantities.

As an example of the other state quantities, the operation speed of the accelerator pedal 52 and the brake pedal 53 can be given. For example, even if the depression amount of the accelerator pedal 52 or the brake pedal 53 is the same, it may be configured such that the negative camber (positive camber) is provided if the operation speed is faster (slower) than a reference value.

Alternatively, as an example of the other state quantities, a gear shift operation of a transmission can be given. For example, it may be configured such that, in the case where a gear shift operation (shift down operation) of increasing the deceleration of the transmission is performed, it is determined that a relatively large acceleration/deceleration is caused by the gear shift operation, whereby the negative camber is provided to the wheel. Accordingly, a slip or a lock of the wheel can be suppressed to improve the acceleration performance and the brake performance of the vehicle.

In the first to third embodiments described above, the case where the negative camber is provided to the wheel in the case where the operation angle of the steering wheel 54 by the driver is greater than or equal to the predetermined value has been described (see S4 and S6 of FIG. 7). However, it is not necessarily limited thereto, and it may obviously be configured such that the camber angle of the wheel is determined based on other state quantities.

As an example of the other state quantities, the operation speed of the steering wheel 54 can be given. For example, even if the operation angle of the steering wheel 54 is the same, it may be configured such that the negative camber (positive camber) is provided in the case where the operation speed is faster (slower) than a reference value.

In the first to third embodiments described above, the process of making a determination based on the operation state of each of the pedals 52 and 53 has been described as an example of the operation state determination unit according to the third aspect. However, it is not necessarily limited thereto, and it is obviously possible to make the determination based on the actual acceleration/deceleration detected by the vehicle speed sensor device 32 (the longitudinal direction acceleration sensor 32a and the horizontal direction acceleration sensor 32b), for example. That is, it may be configured such that the negative camber is provided to the wheel in the case where the acceleration/deceleration of the vehicle is greater than or equal to a predetermined value, and the positive camber is provided in the case where the predetermined value is not reached. In this case, it may be determined based on the acceleration/deceleration in two directions of the longitudinal direction of the vehicle and the horizontal direction of the vehicle, or may be determined based on the acceleration/deceleration in only one of the two directions.

In the first to third embodiments described above, the process of making a determination based on the operation state of the wiper switch 55 has been described as an example of a road surface determination unit according to a fifth aspect of the present invention. However, it is not limited thereto, and it may be configured such that the negative camber is provided to the wheel in the case where the amount of precipitation is detected by the rainfall sensor and a detected value thereof is greater than or equal to a predetermined value, for example. Alternatively, it may be configured such that the state of the road surface is detected by a non-contact optical sensor or the like, and the negative camber or the positive camber is provided to the wheel based on the detection result (such as state of water film on the road surface, snow accumulation state of the road surface, frozen state of the road surface, or pavement state) thereof.

In the first to third embodiments described above, the order of determination on whether to provide the negative camber is in the order of the state of the wiper switch 55, the state of the accelerator pedal 52, the state of the brake pedal 53, the state of the vehicle speed, the state of the turn signal switch 56, the state of the high grip switch 57, and the state of the steering wheel 54 (see S1 to S4). However the order is not limited thereto, and it may obviously be shuffled to obtain another order. Also, a part of the determination steps may obviously be omitted.

In the respective embodiments described above, the case where the camber angles θR and θL provided to the left and right wheels are the same angles (θR=θL) has been described. However, it is not necessarily limited thereto, and camber angles θR and θL differing from each other (θR<θL or θL<θR) may obviously be provided to the left and right wheels.

In the first to third embodiments described above, the case where the first tread 21 or 221 is arranged on the inside of the vehicle and the second tread 22 is arranged on the outside of the vehicle has been described. However, the positional relation is not limited thereto, and may obviously be changed appropriately for each wheel.

For example, the arrangement may be such that the first tread 21 or 221 is on the outside of the vehicle and the second tread 22 is on the inside of the vehicle, and the arrangement may be such that the first tread 21 or 221 is on the outside of the vehicle in the front wheel and the second tread 22 is on the inside of the vehicle in the rear wheel. Alternatively, the positional relation may differ for each wheel.

In the second to fourth embodiments described above, the case where the constant camber angle is 0° has been described. However, it is not necessarily limited thereto, and the constant camber angle may obviously be set the positive camber or the negative camber.

In the respective embodiments described above, the case where the wheel has two types of treads and the case where the wheel has three types of treads have been described, but the wheels may obviously be combined. For example, it may be such that the wheel 2 or 202 having two types of treads is used for the front wheel and the wheel 302 having three types of treads is used for the rear wheel, or vice versa.

In the respective embodiments described above, the case where the first or third tread 21, 221, or 323 has the characteristic of a higher grip performance compared to the second tread 22, and the second tread 22 has the characteristic of a lower rolling resistance compared to the first or third tread 21, 221, or 323 has been described. However, the respective treads 21, 221, 22, and 323 may obviously be configured to have other characteristics. For example, two types of tread patterns (grooves) may be provided such that one tread has a characteristic of a high drainage and the other tread has a characteristic of small road noise.

In the fourth embodiment described above, the case where the camber angle of the wheel 2 is controlled according to whether the wheel 2 is slipping has been described (see S43 to S45 of FIG. 15). However, it is not necessarily limited thereto, and the camber angle of the wheel 2 may obviously be controlled based on other states.

As an example of the other states, the friction coefficient μ of the road surface on which the wheel 2 is driven can be given. Note that the friction coefficient μ can be estimated by the vertical load sensor device 34 as described above. Alternatively, the camber angle of the wheel 2 may be controlled based on whether the wheel 2 is locked (provided with the negative camber when locked).

Hereinafter, modified examples of the present invention will be described. A vehicle control device 1 of a modified example is, in the vehicle control device according to the first aspect of the present invention, the activation control unit includes an acceleration/deceleration determination unit which determines an acceleration/deceleration state of the vehicle, and an acceleration/deceleration-time activation control unit which activates the camber angle adjustment device to adjust the camber angle of the wheel such that the ground contact pressure on the first tread becomes larger than the ground contact pressure on the second tread in the case where the acceleration/deceleration determination unit determines that the acceleration/deceleration state of the vehicle is of a predetermined amount or greater. Note that the acceleration/deceleration-time activation control unit may activate the camber angle adjustment device to adjust the camber angle of the wheel such that the ground contact pressure on the first tread is at least increased in the case where the acceleration/deceleration determination unit determines that the acceleration/deceleration state of the vehicle is of the predetermined value or greater.

With the vehicle control device 1, in the case where the acceleration/deceleration determination unit determines that the acceleration/deceleration state of the vehicle is of the predetermined amount or greater, the ground contact pressure on the first tread can be made larger than the ground contact pressure on the second tread by the acceleration/deceleration-time activation control unit activating the camber angle adjustment device to adjust the camber angle of the wheel. Accordingly, there is an effect that the acceleration performance and the brake performance can be improved by using the first tread having the high grip performance.

On the other hand, in the case where the acceleration/deceleration determination unit does not determine that the acceleration/deceleration state of the vehicle is of the predetermined amount or greater, the ground contact pressure on the second tread can be made larger than the ground contact pressure on the first tread (i.e., the ground contact pressure on the first tread can be reduced) by activating the camber angle adjustment device to adjust the camber angle of the wheel. Accordingly, there is an effect that the fuel saving driving can be realized by using the second tread having the low rolling resistance.

In this manner, with this example of the present invention, there is an effect that the compatibility can be provided between the two performances of acceleration/deceleration and fuel saving which conflict with each other by the activation control unit (acceleration/deceleration-time activation control unit) adjusting the camber angle of the wheel to change the ratio of the ground contact pressure on the first tread and the ground contact pressure on the second tread (including the state where only one tread contacts the ground and the other tread does not contact the road surface).

Note that, with the vehicle control device 1, the case where the acceleration/deceleration determination unit determines (does not determine) that the acceleration/deceleration state of the vehicle is of the predetermined amount or greater refers, for example, not only to a case where the actual acceleration/deceleration state of the vehicle measured by an acceleration sensor has already become (has not become) that of the predetermined amount or greater, but also to a case where the acceleration/deceleration state of the vehicle is expected to be that of the predetermined amount or greater (not to be that of the predetermined amount or greater) based on the operation member (for example, the operation state of the accelerator pedal or the brake pedal) operated by the driver.

A vehicle control device 2 of another modified example of the present invention is, in the vehicle control device according to the first aspect or the vehicle control device 1, the activation control unit includes a turn determination unit which determines a turning state of the vehicle, and a turning-time activation control unit which activates the camber angle adjustment device to adjust the camber angle of the wheel such that the ground contact pressure on the first tread becomes larger than the ground contact pressure on the second tread in the case where the turn determination unit determines that the turning state of the vehicle is of a predetermined amount or greater. Note that the turning-time activation control unit may activate the camber angle adjustment device to adjust the camber angle of the wheel such that the ground contact pressure on the first tread is at least increased in the case where the turn determination unit determines that the turning state of the vehicle is of the predetermined amount or greater.

With the vehicle control device 2, in the case where the turn determination unit determines that the turning state of the vehicle is of the predetermined amount or greater, the ground contact pressure on the first tread can be made larger than the ground contact pressure on the second tread by the turning-time activation control unit activating the camber angle adjustment device to adjust the camber angle of the wheel. Accordingly, there is an effect that the turning performance can be improved by using the first tread having the high grip performance.

On the other hand, in the case where the turn determination unit does not determine that the turning state of the vehicle is of the predetermined amount or greater, the ground contact pressure on the second tread can be made larger than the ground contact pressure on the first tread (i.e., the ground contact pressure on the first tread can be reduced) by activating the camber angle adjustment device to adjust the camber angle of the wheel. Accordingly, there is an effect that the fuel saving driving can be realized using the second tread having the low rolling resistance.

In this manner, with this example of the present invention, there is an effect that the compatibility can be provided between the two performances of turning performance and fuel saving performance which conflict with each other, by the activation control unit (turning-time activation control unit) adjusting the camber angle of the wheel to change the ratio of the ground contact pressure on the first tread and the ground contact pressure on the second tread (including the state where only one tread contacts the ground and the other tread does not contact the road surface).

Note that, with the vehicle control device 2, the case where the turn determination unit determines (does not determine) that the turning state of the vehicle is of the predetermined amount or greater refers not only to a case where the actual turning state of the vehicle has already become (has not become) that of the predetermined amount or greater, but also to a case where the turning state of the vehicle is expected to be that of the predetermined amount or greater (not to be that of the predetermined amount or greater) based on the operation member (for example, the operation state of the steering wheel) operated by the driver.

A vehicle control device 3 of still another modified example of the present invention is, in the vehicle control device according to the first aspect or the vehicle control device 1 or 2, the activation control unit includes a road surface determination unit which determines the state of the road surface on which the wheel is driven, and a road surface change-time activation control unit which activates the camber angle adjustment device to adjust the camber angle of the wheel such that the ground contact pressure on the first tread becomes larger than the ground contact pressure on the second tread in the case where the road surface determination unit determines that the state of the road surface on which the wheel is driven is in a state satisfying a predetermined condition. Note that the road surface change-time activation control unit may activate the camber angle adjustment device to adjust the camber angle of the wheel such that the ground contact pressure on the first tread is at least increased in the case where the road surface determination unit determines that the state of the road surface on which the wheel is driven is in the state satisfying the predetermined condition.

With the vehicle control device 3, in the case where the road surface determination unit determines that the state of the road surface on which the wheel is driven is in the state satisfying the predetermined condition, the ground contact pressure on the first tread can be made larger than the ground contact pressure on the second tread by the road surface change-time activation control unit activating the camber angle adjustment device to adjust the camber angle of the wheel. Accordingly, there is an effect that the driving performance (for example, driving stability in the rain, on snow road, on icy road, or when driving on unpaved road) can be improved by using the first tread having the high grip performance.

On the other hand, in the case where the road surface determination unit does not determine that the state of the road surface on which the wheel is driven is in the state satisfying the predetermined condition, the ground contact pressure on the second tread can be made larger than the ground contact pressure on the first tread (i.e., the ground contact pressure on the first tread can be reduced) by activating the camber angle adjustment device to adjust the camber angle of the wheel. Accordingly, there is an effect that the fuel saving driving can be realized using the second tread having the low rolling resistance.

In this manner, with this example of the present invention, there is an effect that the compatibility can be provided between the two performances of driving stability and fuel saving which conflict with each other, by the activation control unit (road surface change-time activation control unit) adjusting the camber angle of the wheel to change the ratio of the ground contact pressure on the first tread and the ground contact pressure on the second tread (including the state where only one tread contacts the ground and the other tread does not contact the road surface).

Note that, with the vehicle control device 3, the case where the road surface determination unit determines (does not determine) that the state of the road surface on which the wheel is driven is in the state satisfying the predetermined condition refers not only to a case where the state of the road surface has already become (has not become) the state satisfying the predetermined condition, but also to a case where the state of the road surface is expected to become the state satisfying the predetermined condition (not become the state satisfying the predetermined condition) based on the operation member (for example, the operation state of a wiper operation lever) operated by the driver.

A vehicle control device 4 of still another modified example of the present invention is, in the vehicle control device according to the first aspect or any one of the vehicle control devices 1 to 3, the wheel is configured such that the outer diameter in the second tread is approximately constant in the width direction of the wheel and is configured such that the outer diameter in the first tread is gradually decreased from the second tread side toward the inside or outside of the vehicle.

With the vehicle control device 4, the second tread is configured such that the outer diameter is approximately constant in the width direction of the wheel and the first tread is configured such that the outer diameter is gradually decreased from the second tread side toward the inside or outside of the vehicle. Therefore, only the second tread can be caused to contact the ground in a state where the first tread does not contact the road surface, even if a large camber angle is not provided to the wheel (for example, even if the camber angle is set to 0°).

Accordingly, the rolling resistance of the entire wheel can be reduced to further improve the fuel saving performance. Simultaneously, by the first tread not contacting the ground and the second tread contacting the ground at a smaller camber angle, there is an effect that the wear of the two treads can respectively be suppressed to achieve a longer service life.

In the case where the camber angle in the minus direction or the plus direction (negative camber or positive camber) is provided to the wheel to cause the first tread to contact the ground, the ground contact pressure on the first tread can be made uniform in the entire region in the width direction such that the ground contact pressure is not concentrated in a tread end portion since the outer diameter of the first tread is gradually decreased, whereby there is an effect that the driving performance (the turning performance, the acceleration performance, the brake performance, the driving stability in the rain, and the like) can further be improved by efficiently using the first tread having the high grip performance and the biased wear can be suppressed to achieve a longer service life.

A vehicle control device 5 of yet another modified example of the present invention is, in the vehicle control device 4, the wheel includes a third tread configured to have a characteristic of a higher grip performance at least compared to the second tread, the first tread being arranged on the inside of the vehicle, the third tread being arranged on the outside of the vehicle, the second tread being arranged between the first tread and the third tread, and the third tread being configured to have an outer diameter gradually decreasing from the second tread side toward the outside of the vehicle.

With the vehicle control device 5, since the third tread is configured such that the outer diameter is gradually decreased from the second tread side toward the outside of the vehicle, only the second tread can be caused to contact the ground in a state where the first tread and the third tread are apart from the road surface, even if a large camber angle is not provided to the wheel (for example, even if the camber angle is set to 0°) also in the case where the third tread is further provided in addition to the first and second treads.

Accordingly, the rolling resistance of the entire wheel can be reduced to further improve the fuel saving performance. Simultaneously, by the first tread and the third tread not contacting the ground and the second tread contacting the ground at a smaller camber angle, there is an effect that the wear of the respective treads can be suppressed to achieve a longer service life.

In the case where the camber angle in the plus direction (positive camber) is provided to the wheel to cause the third tread to contact the ground, the ground contact pressure on the third tread can be made uniform in the entire region in the width direction such that the ground contact pressure is not concentrated in a tread end portion since the outer diameter of the third tread is gradually decreased. Accordingly, there is an effect that the driving performance (the turning performance, the acceleration performance, the brake performance, the driving stability in the rain, and the like) can further be improved by efficiently using the third tread having the high grip performance and the biased wear can be suppressed to achieve a longer service life.

A vehicle control device 6 of still another modified example of the present invention is, in the vehicle control device 5, the wheel is arranged on the left and the right of the vehicle, and the activation control unit includes a first turning activation control unit which activates the camber angle adjustment device to adjust the camber angle such that both of the left and right wheels are inclined to the inward side of the turn in the case where the vehicle is turned, thereby causing the ground contact pressure on the first tread to be larger than the ground contact pressures in the second and third treads in the turning outer wheel and the ground contact pressure on the third tread to be larger than the ground contact pressures in the first and second treads in the turning inner wheel. Note that the first turning activation control unit may activate the camber angle adjustment device such that the ground contact pressure on the first tread is at least increased in the turning outer wheel and the ground contact pressure on the third tread is at least decreased in the turning inner wheel.

With the vehicle control device 6, the wheel having the first to third treads is arranged on the left and the right of the vehicle, and the first turning activation control unit adjusts the camber angle such that both of the left and right wheels are inclined to the inward side of the turn (i.e., such that turning outer wheel is provided with the negative camber and the turning inner wheel is provided with the positive camber) in the case where the vehicle is turned. Therefore, lateral forces can be applied to the respective left and right wheels to use the lateral forces of the two wheels as the turning force, whereby there is an effect that the turning performance can further be improved.

A vehicle control device 7 of further another modified example of the present invention is, in the vehicle control device according to the first aspect or any one of the vehicle control devices 1 to 4, the wheel is arranged on the left and the right of the vehicle, and the activation control unit includes a second turning activation control unit which activates the camber angle adjustment device to adjust the camber angle of the turning outer wheel of the left and right wheels in the case where the vehicle is turned, thereby causing the ground contact pressure on the first tread in the turning outer wheel to be larger than the ground contact pressure on the second tread in the turning outer wheel. Note that the second turning activation control unit may activate the camber angle adjustment device to adjust the camber angle of the turning outer wheel of the left and right wheels such that the ground contact pressure on the first tread in the turning outer wheel is at least increased.

With the vehicle control device 7, the wheel having the first and second treads is arranged on the left and the right of the vehicle, and the second turning activation control unit adjusts the camber angle of the turning outer wheel of the left and right wheels (for example, causes only the turning outer wheel to be inclined to the inward side of the turn, i.e., the negative camber side, such that the turning inner wheel maintains the same camber angle as that in the straight-ahead driving) in the case where the vehicle is turned. Therefore, there is an effect that the cost of the control drive can be reduced while ensuring the turning performance.

Specifically, with this example of the present invention, the turning performance can be ensured using the first tread having the high grip performance by causing the ground contact pressure on the first tread to be larger than the ground contact pressure on the second tread in the turning outer wheel. In the turning inner wheel, on the other hand, the adjustment of the camber angle is made unnecessary (i.e., maintaining the camber angle of the straight-ahead driving), whereby the cost of the control of the vehicle control device or the cost of driving the camber angle adjustment device can be reduced.

A vehicle control device 8 of still another modified example of the present invention is the vehicle control device according to the first aspect or any one of the vehicle control devices 1 to 7 including a ground speed detection unit which detects the ground speed of the vehicle, a rotational speed detection unit which detects the rotational speed of the wheel, and a slip determination unit which determines whether the wheel is slipping based on the ground speed and the rotational speed detected by the ground speed detection unit and the rotational speed detection unit, respectively. In the vehicle control device 8, the activation control unit includes a slipping-time activation control unit which activates the camber angle adjustment device to adjust the camber angle of the wheel in the case where the slip determination unit determines that the wheel is slipping, thereby causing the ground contact pressure on the first tread or the third tread to be larger than the ground contact pressure on the second tread. Note that the slipping-time activation control unit may activate the camber angle adjustment device to adjust the camber angle of the wheel such that the ground contact pressure on the first tread or the third tread is at least increased in the case where the slip determination unit determines that the wheel is slipping.

With the vehicle control device 8, the slip determination unit can adjust the camber angle of the slipping wheel to increase the ground contact pressure on the first tread or the third tread in the case where the slip determination unit determines that the wheel is slipping. Accordingly, there is an effect that the grip force can be recovered to improve the driving stability of the vehicle.

In the flowchart (camber control process) shown in FIG. 7, the processes of S2 and S3 correspond to the acceleration/deceleration determination unit and the process of S6 corresponds to the acceleration/deceleration-time activation control unit of the vehicle control device 1, the process of S4 corresponds to the turn determination unit and the process of S6 corresponds to the turning-time activation control unit of the vehicle control device 2, and the process of S1 corresponds to the road surface determination unit and the process of S6 corresponds to the road surface change-time activation control unit of the vehicle control device 3, respectively.

In the flowchart (camber control process) shown in FIG. 11, the processes of S2 and S3 correspond to the acceleration/deceleration determination unit and the process of S27 corresponds to the acceleration/deceleration-time activation control unit of the vehicle control device 1, the process of S4 corresponds to the turn determination unit and the process of S26 corresponds to the turning-time activation control unit of the vehicle control device 2, the process of S1 corresponds to the road surface determination unit and the process of S27 corresponds to the road surface change-time activation control unit of the vehicle control device 3, and the process of S26 corresponds to the second turning activation control unit of the vehicle control device 7, respectively.

In the flowchart (camber control process) shown in FIG. 14, the processes of S2 and S3 correspond to the acceleration/deceleration determination unit and the process of S27 corresponds to the acceleration/deceleration-time activation control unit of the vehicle control device 1, the process of S4 corresponds to the turn determination unit and the process of S36 corresponds to the turning-time activation control unit of the vehicle control device 2, the process of S1 corresponds to the road surface determination unit and the process of S27 corresponds to the road surface change-time activation control unit of the vehicle control device 3, and the process of S36 corresponds to the first turning activation control unit of the vehicle control device 6, respectively.

In the flowchart (camber control process) shown in FIG. 15, the process of S41 corresponds to the ground speed detection unit, the process of S42 corresponds to the rotational speed detection unit, the process of S43 corresponds to the slip determination unit, and the process of S45 corresponds to the slipping-time activation control unit of the vehicle control device 8, respectively.

What is claimed is:

1. A vehicle control device which activates a camber angle adjustment device which adjusts a camber angle of a wheel to control the camber angle of the wheel for a vehicle including the wheel and the camber angle adjustment device, the vehicle control device comprising:
    an activation control unit which controls an activation state of the camber angle adjustment device, wherein
    the wheel includes at least a first tread and a second tread having a different characteristic from the first tread, the first tread being arranged on an inside or an outside of the vehicle with respect to the second tread in a width direction of the wheel,
    the first tread is configured to have a characteristic of a higher grip force compared to the second tread and the second tread is configured to have a characteristic of a smaller rolling resistance compared to the first tread, and
    the activation control unit changes a ratio of a ground contact pressure on the first tread and a ground contact pressure on the second tread of the wheel by controlling the activation state of the camber angle adjustment device to adjust the camber angle of the wheel.

2. The vehicle control device according to claim 1, wherein the activation control unit includes:
    a ground speed determination unit which determines a ground speed of the vehicle; and
    a low-speed-time activation control unit which adjusts the camber angle of the wheel by activating the camber angle adjustment device to at least increase the ground contact pressure on the first tread in a case where the ground speed determination unit determines that the ground speed of the vehicle is lower than or equal to a predetermined speed.

3. The vehicle control device according to claim 2, wherein the activation control unit includes:
    an operation state determination unit which determines an operation state of an operation member operated by a driver; and
    an operation-time activation control unit which adjusts the camber angle of the wheel by activating the camber angle adjustment device to at least increase the ground contact pressure on the first tread in a case where the operation state determination unit determines that the operation state of the operation member satisfies a predetermined condition.

4. The vehicle control device according to claim 1, wherein the activation control unit includes:
    an operation state determination unit which determines an operation state of an operation member operated by a driver; and
    an operation-time activation control unit which adjusts the camber angle of the wheel by activating the camber angle adjustment device to at least increase the ground contact pressure on the first tread in a case where the operation state determination unit determines that the operation state of the operation member satisfies a predetermined condition.

5. The vehicle control device according to claim 1, wherein:
    the second tread is arranged to the outside of the first tread, relative to the vehicle; and
    the activation control unit controls the camber angle adjustment device to shift the camber angle in a positive direction to decrease rolling resistance.

* * * * *